Figure 6:
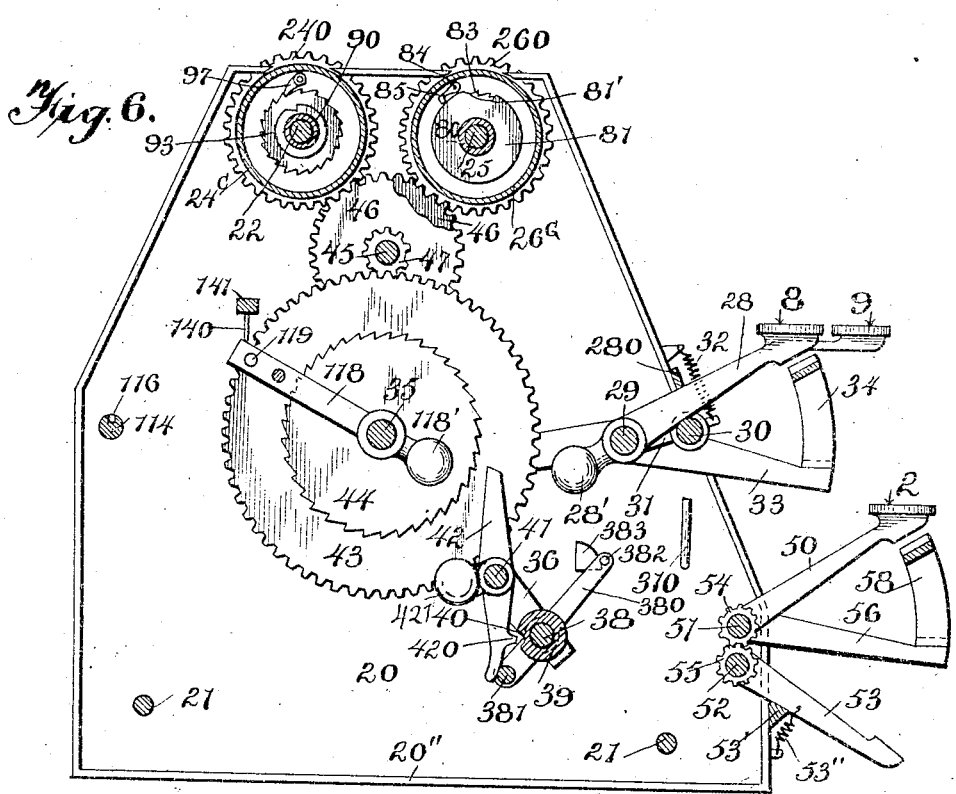

No. 707,652. Patented Aug. 26, 1902.
E. W. SIBLEY.
CALCULATOR.
(Application filed July 3, 1901.)
(No Model.) 8 Sheets—Sheet 1.
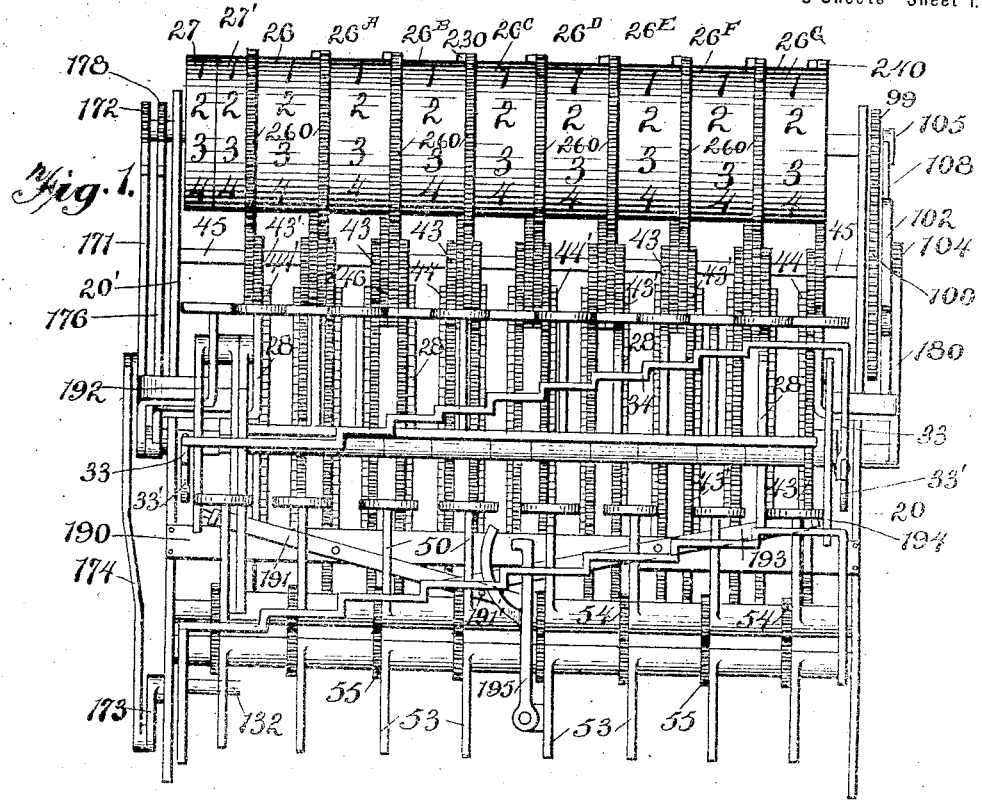
Fig. 1.
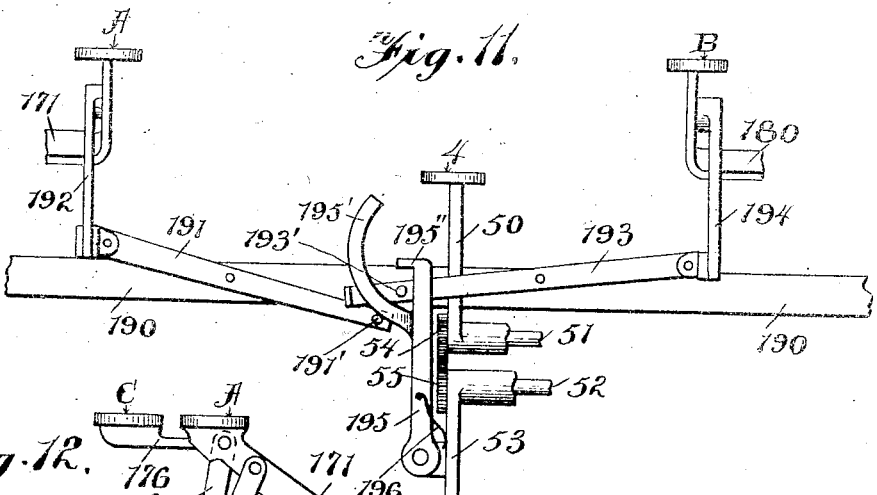
Fig. 11.
Fig. 12.
Witnesses
Geo. E. Bech.
M. R. Brown.
Inventor
Edward W. Sibley.
By
William H. Reid,
Attorney

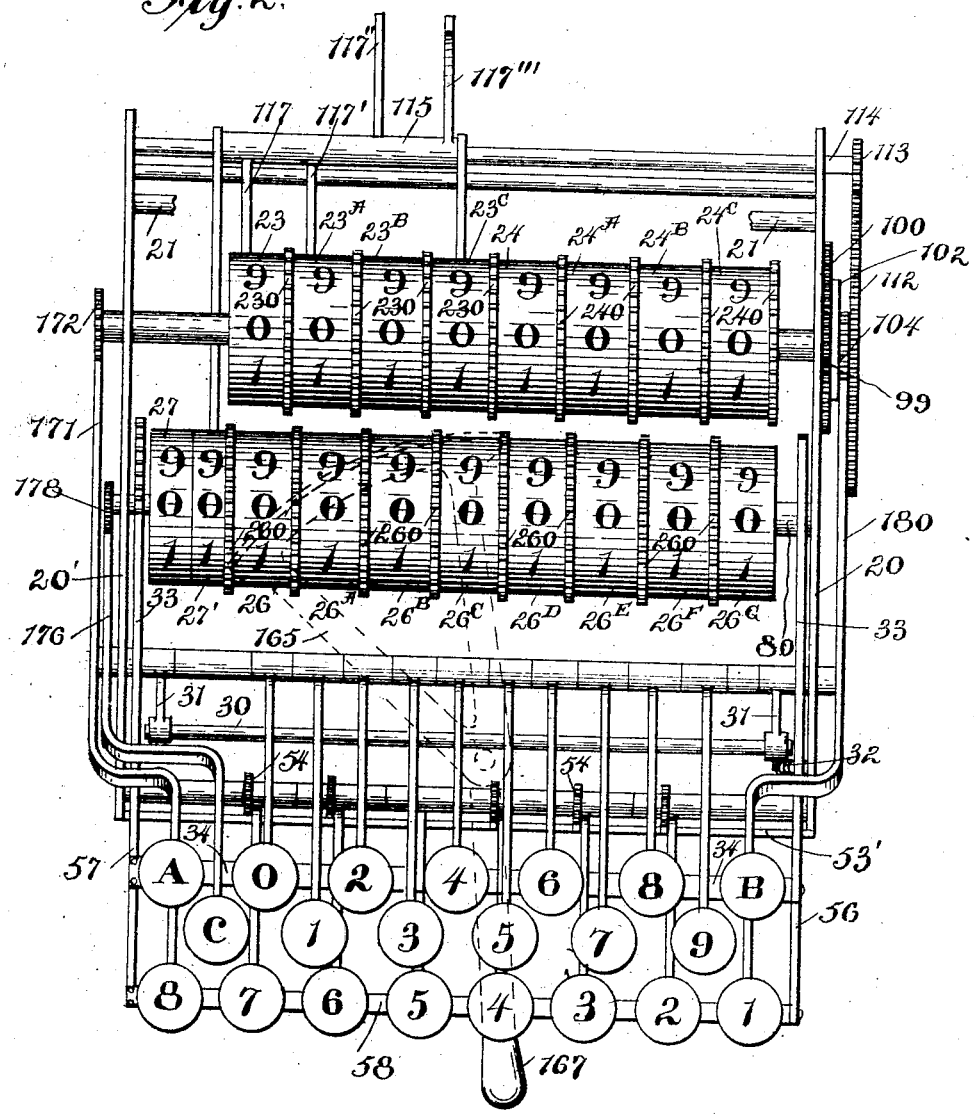

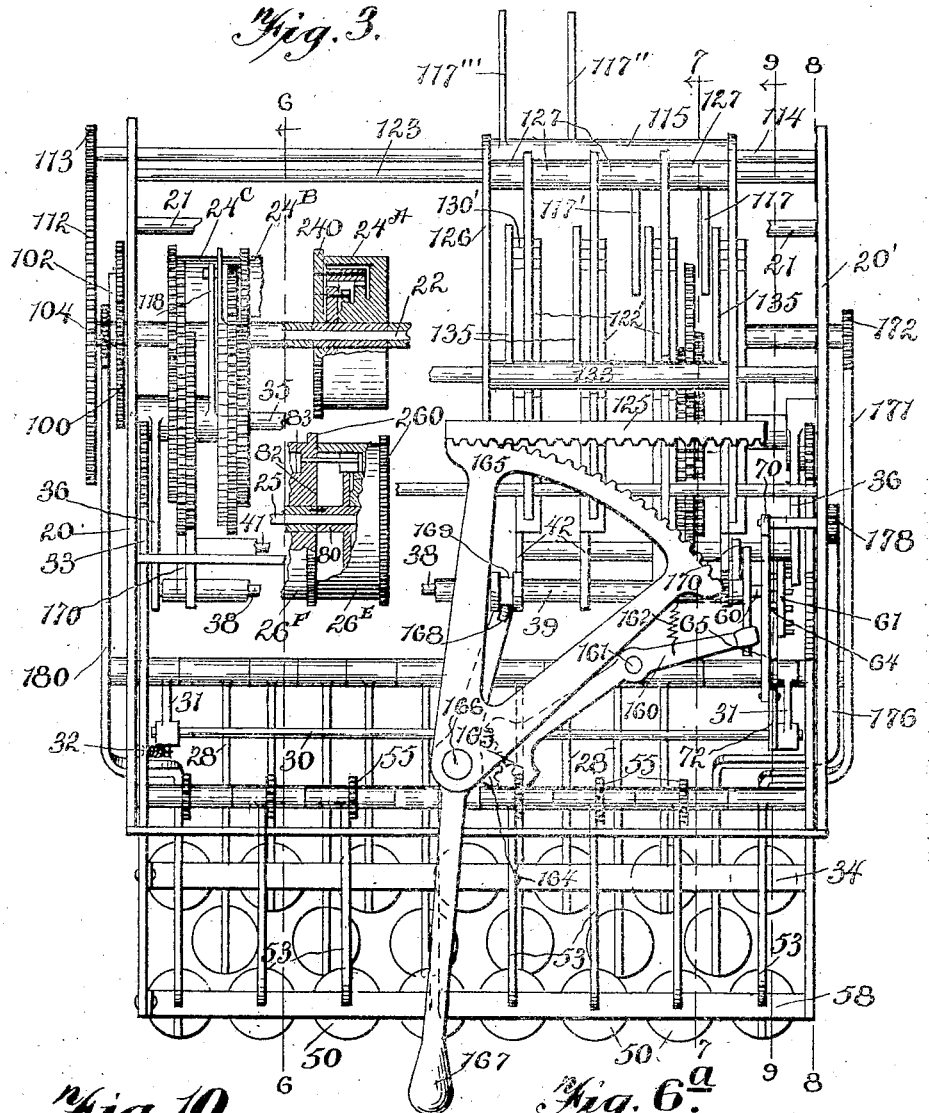

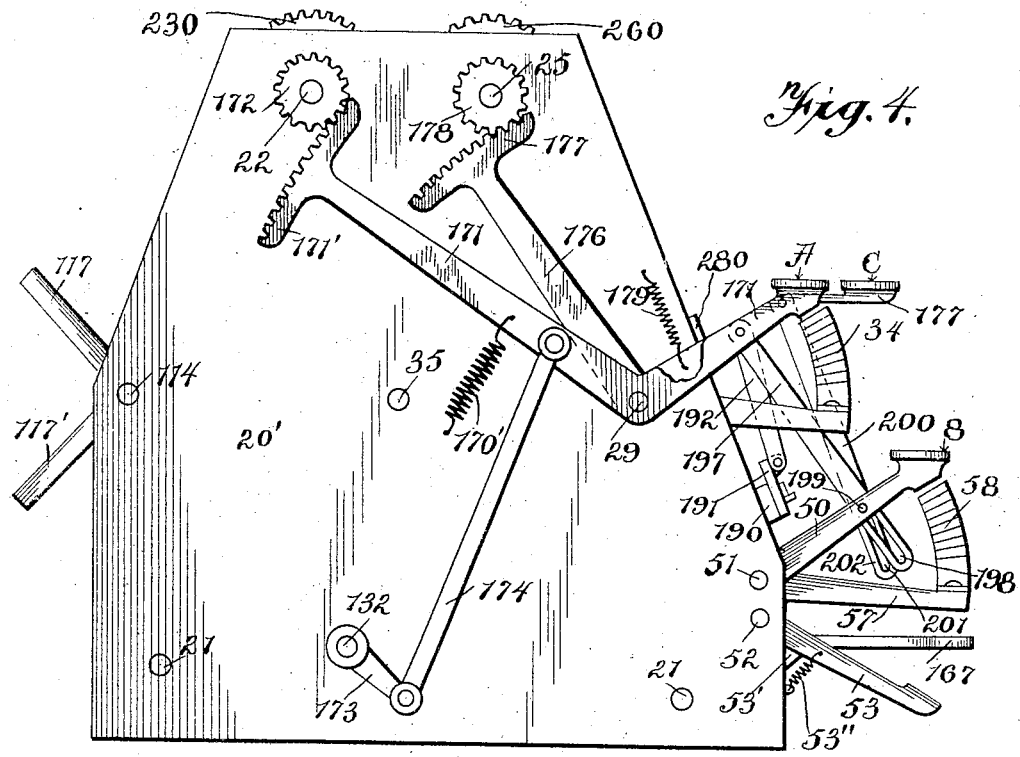

No. 707,652.  
E. W. SIBLEY.  
CALCULATOR.  
(Application filed July 3, 1901.)  
Patented Aug. 26, 1902.

(No Model.)  
8 Sheets—Sheet 5.

Witnesses  
Geo. E. Fuchs.  
M. R. Brown.

Inventor  
Edward W. Sibley  
By William H. Reid,  
Attorney

No. 707,652. Patented Aug. 26, 1902.
E. W. SIBLEY.
CALCULATOR.
(Application filed July 3, 1901.)
(No Model.) 8 Sheets—Sheet 6.
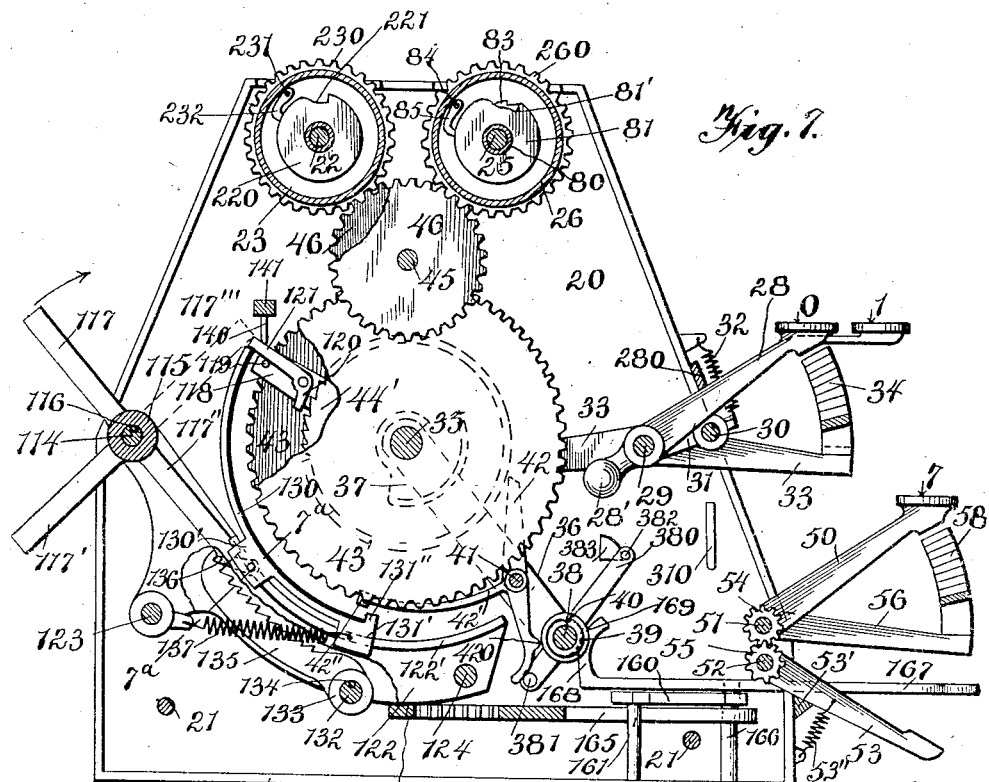
Fig. 7.
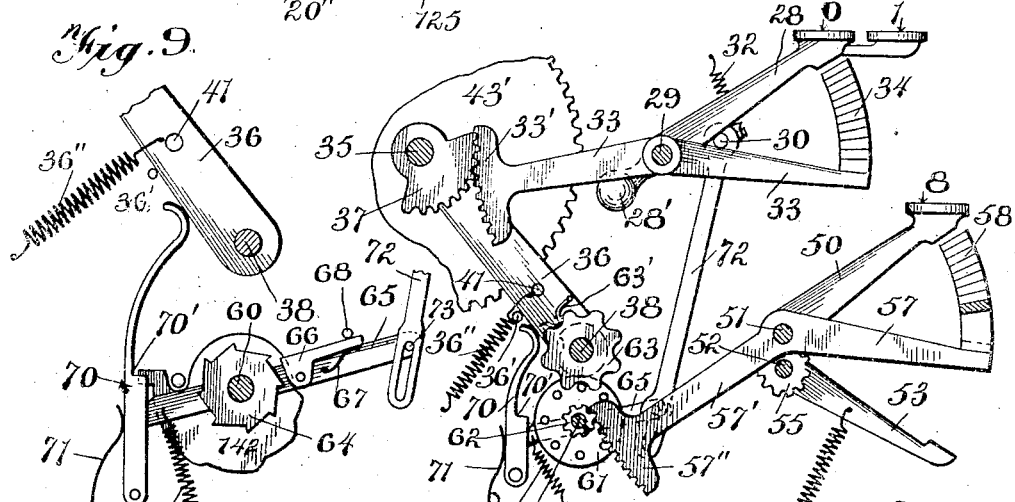
Fig. 9. Fig. 7ª. Fig. 8.
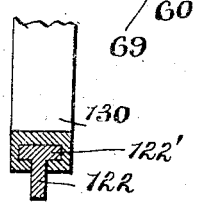
Witnesses
Geo. E. Frech.
M. R. Brown.
Inventor
Edward W. Sibley.
By William H. Reid.
Attorney.

No. 707,652. Patented Aug. 26, 1902.
E. W. SIBLEY.
CALCULATOR.
(Application filed July 3, 1901.)
(No Model.) 8 Sheets—Sheet 7.
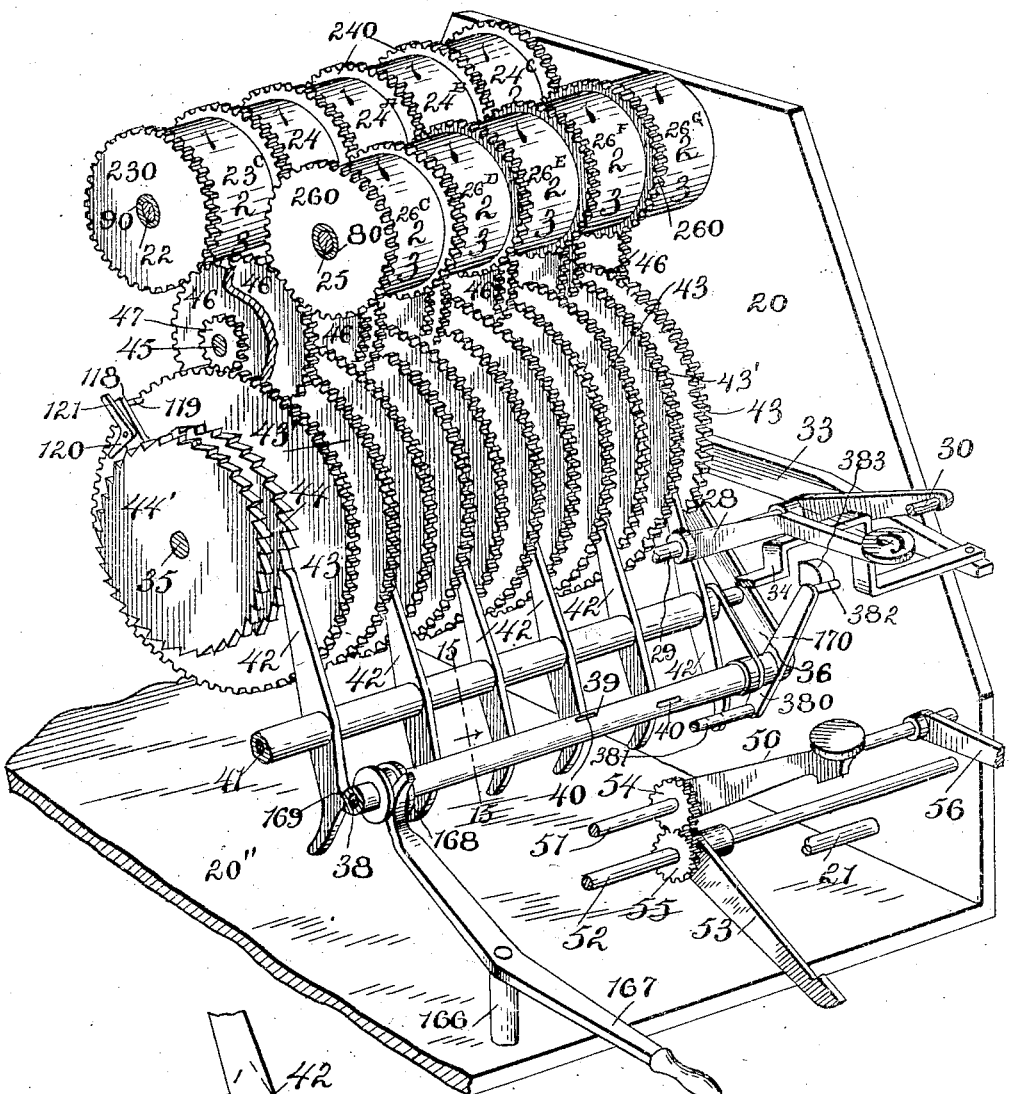

No. 707,652. Patented Aug. 26, 1902.
E. W. SIBLEY.
CALCULATOR.
(Application filed July 3, 1901.)
(No Model.) 8 Sheets—Sheet 8.

Witnesses
Geo. E. Tech.
W. R. Brown.

Inventor
Edward W. Sibley.
By William H. Reid
Attorney

UNITED STATES PATENT OFFICE.

EDWARD W. SIBLEY, OF PROVIDENCE, RHODE ISLAND, ASSIGNOR OF TWO-THIRDS TO HENRY DUNSTER, JR., AND HORACE THURSTON, OF PROVIDENCE, RHODE ISLAND.

CALCULATOR.

SPECIFICATION forming part of Letters Patent No. 707,652, dated August 23, 1902.

Application filed July 3, 1901. Serial No. 67,005. (No model.)

*To all whom it may concern:*

Be it known that I, EDWARD W. SIBLEY, of the city of Providence, in the county of Providence and State of Rhode Island, have invented certain new and useful Improvements in Calculators; and I do hereby declare that the following is a full, clear, and exact description thereof, reference being had to the accompanying drawings, and to the figures of reference marked thereon, which form a part of this specification.

This invention relates to calculators.

The object of my invention is to provide an improved machine that can be easily and quickly adjusted to perform any of the common arithmetical processes of addition, multiplication, and division.

A further object of my invention is to provide improved means whereby in the act of registering a number on a set of indicators when a key has been operated to register one of the end digits of the number the operation of the succeeding digit-keys will be automatically registered on the indicator *seriatim*.

A further object of my invention is to provide in such a machine means whereby the act of merely depressing keys corresponding to the digits in two numbers whose product is desired will without further manipulation by the operator produce at once the desired product on the result-indicating means; and my invention comprises such further details of construction and arrangement, either separately or in combination, as will be described hereinafter, with reference to the accompanying drawings, and then particularly pointed out in the claims.

Figure 13:
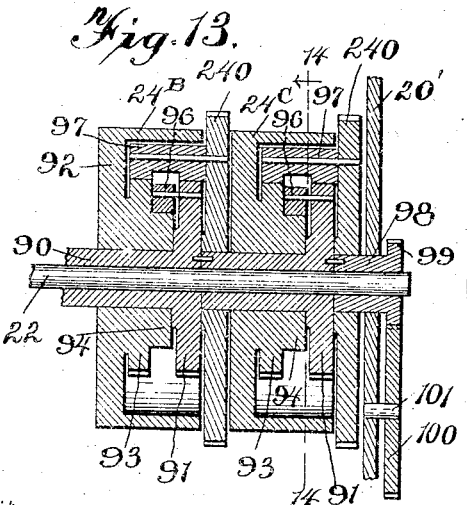
Figure 14:
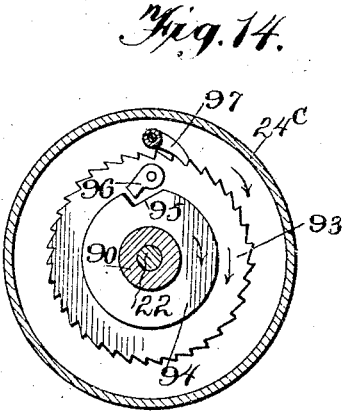
Figure 17:
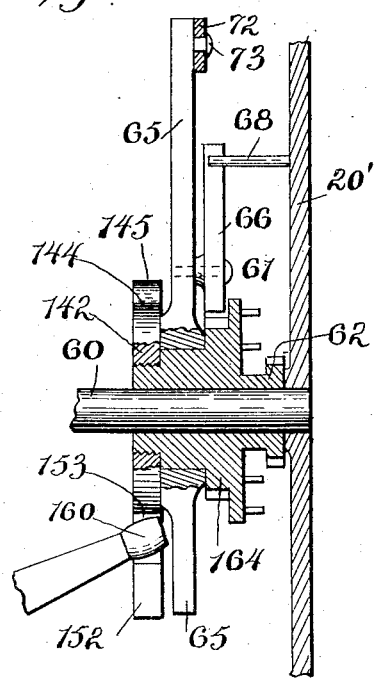
Figure 18:
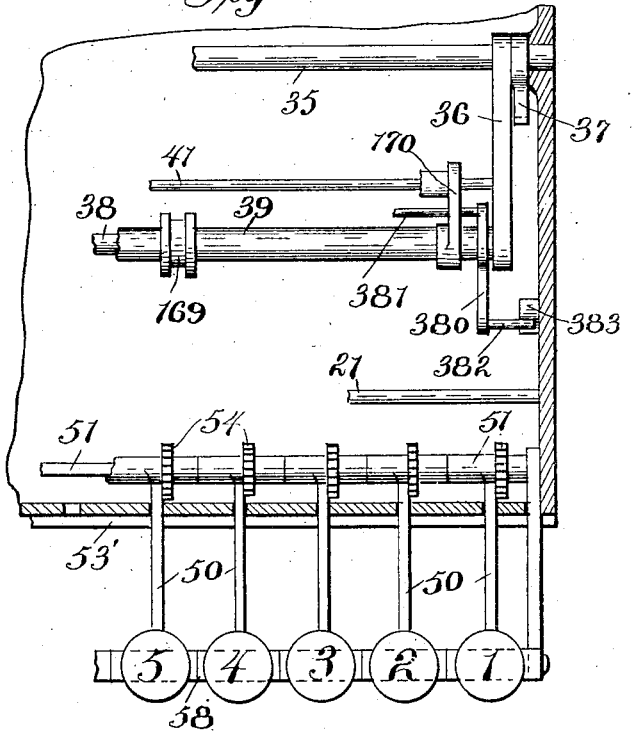
Figure 19:
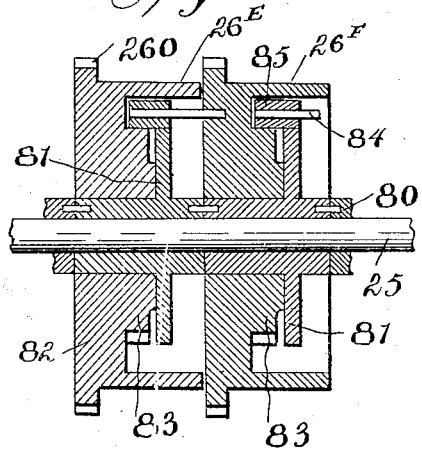
Figure 20:
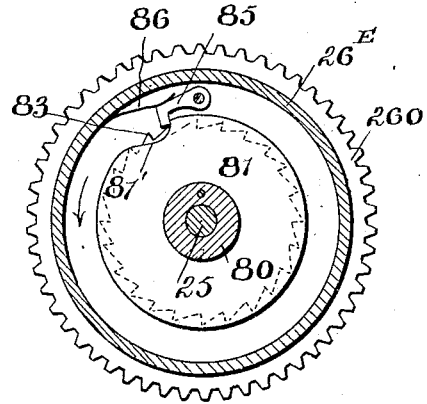

In the accompanying drawings, representing a machine embodying my present invention, Figure 1 represents a front elevation of the machine. Fig. 2 shows a top view of the same. Fig. 3 is a view of the under side of the machine. Fig. 4 is an elevation of the left end of the machine. Fig. 5 represents an elevation of the right end. Fig. 6 shows a vertical section taken down through the machine on line 6 6 in Fig. 3 looking to the left. Fig. 6ᵃ is a detail view of some of the parts shown in Fig. 6 enlarged. Fig. 7 shows a vertical section through the machine on line 7 7 in Fig. 3 looking to the left. Fig. 7ᵃ is a section on the line 7ᵃ in Fig. 7. Fig. 8 shows a partial vertical section, hereinafter explained. Figs. 9, 10, 11, and 12 show detached views of parts of the machine, more fully described in the specification. Figs. 13 and 14 are sections of one of the cylinders on the back shaft, left hand. Fig. 15 is an enlarged section of two shafts and cams, taken vertically on line 15 15, Fig. 16. Fig. 16 is a perspective view of a part of the machine with the keys removed, showing the relative positions of the cam-shaft, pawl, shaft, the ratchet-wheels, and gears that drive the front and back figure-cylinders. Fig. 17 is a section of the parts shown in Fig. 9. Fig. 18 is a detail of the pawl connections. Figs. 19 and 20 show views of the front number-cylinders.

Referring now to the accompanying drawings, in which the reference characters indicate the same parts throughout the several views, 20 20' represent two side plates that are rigidly connected by tie-rods 21. Two series of number-cylinders are arranged between these side plates. A shaft 22 carries one of said series that comprises one set of cylinders 23 23ᴬ 23ᴮ 23ᶜ and another set of cylinders 24 24ᴬ 24ᴮ 24ᶜ. A shaft 25 carries the other series of number-cylinders, comprising the cylinders 26, 26ᴬ, 26ᴮ, 26ᶜ, 26ᴰ, 26ᴱ, 26ᶠ, and 26ᴳ and two cylinders 27 and 27'. These cylinders are preferably all of the same diameter, and the two series are disposed in horizontal alinement, as will be seen by reference to Figs. 1 and 2.

At the front part of the machine are arranged the keys for operating the mechanism, that are arranged in two banks, the lower bank comprising eight keys and numbered from "1" to "8," and an upper bank comprising ten keys, numbered from "0" to "9," and also three additional keys bearing the characters "A B C." Each of the numbered keys of the upper bank is secured to a lever 28, that is pivoted on a shaft 29, extending from one side plate to the other. (See Fig. 7.) A rod 30 extends under each of the key-levers and at each extremity is secured to a crank 31, pivoted on the shaft 29. A spring 32 connects one of these cranks with the side plate adjacent and causes the rod 30 to return the key-bars when depressed. A pair of stops 310 serve to limit the downward movement of the cranks 31 and give each key the same range of movement. As shown in Fig. 8, a lever 33 is pivotally mounted by its middle part on the said rod 29, which lever at its inner end has a segment-gear 33'. The other extremities of the levers are connected by a stepped bar 34, (see Fig. 1,) the successive steps of which lie in the path of movement of the key-bars 28, respectively, so that when one of these keys is depressed it will strike one of the steps and rock the levers 33. A shaft 35 is secured between the side plates and has pivoted thereon near each extremity an arm 36, on which is secured a segment-gear 37, arranged to engage the said segment-gear 33', and thus the arms 36 will be rocked by the depression of one of the key-bars 28 and the stepped bar 34. A shaft 38 extends between the extremities of the arms 36, on which is mounted a sleeve 39, free to move axially, but secured against rotation by a spline 38'. This sleeve 39 has a series of notches 40 therein helically disposed. Another shaft 41 extends between the arms 36 and has loosely mounted thereon a series of eight pawls 42. The lower parts of the pawls are opposite the notches in the sleeve. On the said shaft 35 are loosely mounted a series of pairs of toothed wheels, four of the pairs comprising a gear-wheel 43, secured to a ratchet-wheel 44, and the other four pairs of gears comprising a gear-wheel 43' and a ratchet-wheel 44'. From Fig. 16 it will be observed that there are two of said pairs of wheels for each of the pawls 42 and that these pairs are disposed in reverse sequence. Beginning at the right-hand side, there is a gear 42 and attached ratchet-wheel 44. Then a short distance apart is located a ratchet-wheel 44', secured to a gear 43'. Adjacent is a gear 43, attached to a ratchet-wheel 44. This alternation is continued to the other side of the machine, where is a pair comprising a ratchet-wheel 44', secured to a gear 43'. Four of the pawls have counterweights 421, and the others have extensions 42', which tend to move the pawls toward their ratchet-wheels.

Each of the number-cylinders of the set 23 has a gear 230 connected therewith in a manner hereinafter described, and each of the number-cylinders 24 has connected therewith a gear 240. Also each of the number-cylinders 26 is connected with a gear 260. A shaft 45 extends between the side plates and has a series of pairs of gear-wheels loosely mounted thereon, comprising a large wheel 46 and a small one 47, the small one in each pair being in engagement with one of the gears 43 or 43' and the large one with one of the said gears connected with the number-cylinder. From Fig. 16 it will be seen that the left-hand ratchet-wheel in each pair through these gears 46 47 drives a back cylinder and the right-hand ratchet-wheel in each pair drives one of the front cylinders.

From the above it will be seen that when a key-bar 28 is depressed the step-bar 34 through segment-gears 33' 37 will serve to rock the bar 38, thus moving the parts 42. Any one of which latter that may engage the opposite ratchet-wheel will rotate that wheel and through the aforesaid intermediate gears serve to rotate one of the number-cylinders a certain distance, according to the distance the key-bar 28 depressed the step-bar. A stop-pin 36', secured in one of the side plates, serves to limit the downward movement of the arms 36. One or more springs 36" connects one of the arms 36 with one of the side plates and serves to move the arms 36 and the connected parts back into contact with this stop-pin 36' when the key-bar 28 is released. Each of the key-bars 28 has a counterweight 28', that will normally retain the key-bar with the key in its upper position and the bar in contact with a stop-bar 280.

The lower bank of eight key-bars 50 is loosely mounted on a shaft 51, that extends from one of the side plates to the other. A shaft 52 extends between the side plates below the shaft 51 and in vertical alinement therewith, which latter shaft carries an arm 53, arranged in vertical alinement with each of the key-bars 50, respectively. In each of these pairs of alining bars there is a gear 54, secured to the key-bar, that engages a gear 55, secured to the adjacent lower bar. Hence when one of the key-bars 50 is depressed its opposite lower bar will move upwardly. A spring 53' serves to return each of the bars 53 to its lower position and the key-bar 50 to its normal position. A bar 53' limits the downward movement of the bar 53. On the said shaft 51 are loosely mounted a pair of cranks 56 and 57, one at each side of the machine. Between their front extremities is secured a stepped bar 58, the latter being disposed in the path of movement of the bars 50 and 53 and intermediate of the bars in the pairs. Consequently it will be seen that when one of these keys is depressed it will either strike one of the steps of the step-bar and depress the latter until the opposite lower bar rising will limit this movement, or else when a key to the left of the machine is depressed its opposite lower bar rising will impinge on and carry the step-bar upward until they are met by the descending key, thus limiting this movement. The said crank 57 has an extension 57', that carries a segment-gear 57". A stud 60 is secured to the left side plate of the machine and carries a pin-wheel 61, to which is secured a gear 62. The gear 57" engages this gear 62, thus rotating the pin-wheel by the movement of the bar 57 when actuated by one of the key-bars 50. On the said shaft 38, carried by arms 36, is secured a gear 63, that engages the pin-wheel 61 when the arms 36 are in their lowermost position. When the key-bar 50 is depressed through the step-bar 58, gear 57'', gear 62, and pin-wheel 61, the gear 63 is rotated, which will rotate the notched sleeve 39, and thus bring different ones of the helically-arranged notches into engagement with the pawls 42, according to the distance the step-bar 58 is moved by the key depressed. From the above, in connection with Fig. 1, it will be obvious that when key 1 of the lower bank is depressed the step-bar will move its maximum distance; but when key 7 is depressed the step-bar will move downward its minimum distance, which is the distance of one step. On the said stud 60 is mounted a ratchet-wheel 64, secured to the pin-wheel 61, but on the opposite side thereof from the gear 62. A rock-bar 65 is pivotally mounted on this stud 60 adjacent the ratchet-wheel 64 and carries a pawl 66, that engages the teeth of this ratchet-wheel 64 and which has a bearing-spring 67. A stop-pin 68, secured in one of the side plates, engages the free extremity of the pawl 66 and throws it out of engagement with the ratchet-wheel when the rock-bar reaches its normal position. A spring 69, connected between the rock-bar and one of the side plates, tends to move the rock-bar at the part carrying the pawl upwardly toward said stop-pin 68. A pivoted lever 70 has its free extremity arranged to be struck by the arm 36 upon the downward movement of the latter and has a small spring 71, tending to force it into contact with one extremity of the rock-bar 65. This lever 70 has a notched portion 70', arranged to engage one end of the rock-bar 65 at a certain part of its movement. A connecting-bar 72 is pivoted on the bar 30 by one extremity and has a slot in its other extremity engaging a pin 73, secured at one end of the rock-bar 65. The operation of these latter parts is as follows: When any one of the number-keys of the upper bank is depressed, thus carrying down the bar 30, the bar 72 will be depressed, and thus carry the pawl downward, and the other extremity of the rock-bar will rise and engage the notched portion 70' of the lever 70'', the latter being forced toward the rock-bar by its spring 71. It will be remembered that the depression of the key-bar 28 as soon as it engages with the step-bar 34 will cause the arm 36 to move upwardly and away from its stop-pin 36'. Hence this lever 70 will be free to move over and receive the end of the rock-bar 65 at its notched portion at this time. During this latter movement of the rock-bar its pawl 66 will ride on the teeth of the ratchet-wheel without moving the same; but when the key-bar 28 is released the arm 36, moving downward, will engage the end of the lever 70 and cause the latter to move away from the rock-bar 65 and trip the engaging end of the rock-bar, which end will be carried downwardly by the spring 69. The other end of the rock-bar will move upwardly, and the pawl 66 will now engage the ratchet-wheel 64 and rotate it a certain distance, preferably one notch. The slot in the arm 72 will permit the rock-bar 65 to rise a certain distance before the end of the rock-bar 65 is released from the lever 70. When the rock-bar 65 reaches the latter part of its upward movement, the tail of the pawl will strike the stop-pin 68, that will move the pawl out of engagement with the ratchet-wheel 64 and leave the latter free to rotate. A spring 63', mounted on the arm 36, prevents the gear 63 moving when it is out of engagement with the pin-wheel 61 and also serves to hold the notched sleeve so that some one of its notches is in a position to engage its corresponding pawl. When these parts are in a position to commence a calculation, the pawl 42 at the left side of the machine has its lug 420 in engagement with the notch 40 at the left extremity of the notched sleeve 39. Now when any one of the number-keys of the upper bank have been depressed and released the gear 63 will be rotated a distance that will rock the notched sleeve 39 through an arc equal to the circumferential distance apart of the consecutive notches, which will result in the first left-hand pawl being moved away from its ratchet-wheel and the next pawl being brought into position for engagement with its ratchet-wheel by reason of the lug on the latter pawl falling into the corresponding notch in the notched sleeve 39. When another key of the upper bank has been depressed and released, the notched sleeve will be rocked through the same distance as before, and the last-mentioned pawl 42 will be thrown out of engagement with its ratchet-wheel, and the next pawl to the right of this latter pawl will have its lug 42' brought into position for engagement with its corresponding notch 40, thus permitting this pawl to drop into engagement with its ratchet-wheel, and each succeeding depression and release of a number-key in the upper bank will throw the engaging pawl away from its ratchet and will bring the next pawl in order into engagement.

On the shaft 38 are mounted a pair of arms 380, one at each side of the machine, and between one extremity of these arms is secured a rod 381. The other extremity of these arms each carries a pin 382, that at the latter portion of the downward movement of the arms 36 will be brought into contact with the cam-plates 383, secured to the side plates of the machine. These plates 383 will serve to rock the lever 380, and thereby cause the rod 381 to strike the lower portion of each of the pawls 42 and move them, so that each pawl will be forced away from the cam-sleeve and also move them away from the ratchet-wheels 44 44'.

Each of the number-cylinders in the set 26 is connected with its respective gear-wheel as follows: The shaft 25 has loosely mounted thereon a series of sleeves 80, each having a disk integral therewith. The cylinder 26 has a disk portion 82, having a ratchet-wheel 83, also integral therewith. The gear-wheel 260 is preferably integral with the cylinder 26, which latter gear rotates the cylinder from the intermediate gears 47, as hereinbefore described. Each of the disks 82 carries a pin 84, on which is pivoted a pawl 85. From Fig. 19 it will be seen that this pawl extends into the adjacent cylinder to the left of its supporting-cylinder and engages with a ratchet-wheel 83. The diameter of the disk 81 is somewhat greater than the diameter of the ratchet-wheel 83 at the extremity of its teeth, as will be seen from Fig. 6ᵃ. The disk 81 has a notched portion 81', shaped substantially as shown. Normally this disk 81 is stationary and the adjacent ones in the series are secured together. The disk portion 82 of the cylinder being free to move on the hub 80 when the cylinder is rotated by the intermediate gear 47, the pawl 85 will be carried around and will ride on the periphery of the disk 81 in the direction indicated by the arrow until it reaches the notch 81', when it will be forced into this notch by a spring 86, and its extremity 85' will then engage one of the teeth 83 of the ratchet-wheel, and thereby rotate this wheel; but the lower portion 85'' of the pawl 85 will engage the wall of this notch, and when it shall have moved the ratchet-wheel the distance of one tooth the incline of the notch will serve to force the pawl from engagement with its teeth and out of the notch; but when the disks 81 are driven in the direction of the arrow by means hereinafter described, the disk 82 and the pawl being stationary, when the disk brings its notch around to the pawl the latter will be forced into the notch at its obtuse portion, and thereupon will have its angular portion 85''' engage the angular portion 81'' of the disk 81. This will cause the disk to carry the pawl and the cylinder and gear connected therewith around for the balance of the rotation of the disk. The ratchet-wheel 83 preferably has ten teeth. Consequently when the cylinder to the right hand of this series makes one revolution it will move the adjacent cylinder to the left one-tenth of a revolution. The notch on the disk 81 is so disposed that this movement of the adjacent cylinder is effected at the latter part of the movement of the driving-cylinder when making a full revolution—that is, preferably when the driving-cylinder is moving from "9" to "0."

On the shaft 25 are two number-cylinders 27 and 27', whose construction and operation are identical with number-cylinder 26, except that the gear-wheels 260 are omitted—i. e., the cylinder 26 when moving from "9" to "0" will drive the cylinder 27 the distance of one number from another, and this cylinder 27 when moving from "9" to "0" will drive the cylinder 27' a distance equal to that of four numerals apart. The four number-cylinders 23, &c., are loosely mounted on shaft 22. The gear-wheel 230 is preferably integral with the number-cylinder 23, &c. This gear 230 carries a pin 231, on which is mounted a pawl 232. The shaft 22 has secured thereto a disk 220 for each of the number-cylinders 23, &c., which disk is arranged to have the pawl 232 ride on its periphery. A notch 221 is made in this disk, one end wall of which makes an obtuse angle with the periphery and the other end wall makes an acute angle with the periphery. When the gears 230 are operated by their engaging driving-gears, they always rotate in the direction of the arrow, as shown in Fig. 19, and consequently the pawl will enter the notch at the acute angle and pass out therefrom at the obtuse angle and not actuate the disk 220.

The construction and operation of the number-cylinders 24 24ᴬ 24ᴮ 24ᶜ is as follows: On the shaft 22 are mounted a series of sleeves 90, each having a ratchet-wheel 91, preferably integral therewith, the adjacent collars being secured together. The cylinder 24 has a disk portion 92, having integral therewith a ratchet-wheel 93 and a disk portion 94, the latter having a single notch 95 therein, as shown. The ratchet-wheel 91 carries a pawl 96, that engages the notch 95 at a certain part of its movement. The gear-wheel 240 is mounted loosely on a sleeve 90 and has pivoted to one side a pawl 97, which extends into the interior of the cylinder adjacent to the left. This pawl 97 is of sufficient length to engage with both of the ratchet-wheels 91 and 93. A sleeve 98 is mounted loosely on the shaft 22 and extends through the side plate 20', and on its outer end is secured a small gear 99, the purpose of which will be presently set forth. The gear 240, connected with the number-cylinder 24ᶜ, is mounted loosely on the sleeve 98. Now suppose that through the operation of the pawl 42 at the right-hand side the gear 240 at the right-hand side is operated. Then its pawl 97, attached, will rotate the ratchet-wheel 93, which will cause the cylinder 24ᶜ to rotate simultaneously with this gear 240; but this pawl 97 is also in engagement with the ratchet-wheel 91, which will cause this ratchet-wheel and its sleeve 90 to rotate simultaneously with this cylinder; but the other three sleeves 90 and ratchet-wheels 91 being secured together and to this last-mentioned sleeve they will all be rotated. The ratchet-wheel 91, located in the cylinder 24ᴮ, thus rotating with its sleeve 90 will move freely in the direction of the arrow under its engaging pawl 97 and without actuating the cylinder 24ᴮ, and for like reasons the ratchet-wheel 91 in the cylinders 24ᴬ and 24 will not disturb these two cylinders during this movement. During this just-described movement of the ratchet-wheel 91 in each of the cylinders 24ᴮ, 24ᴬ, and 24 the pawl 96 will move in the direction of its adjacent arrow and not engage notch 95 in a way to operate the disk 94; but when the gear 99 is operated, as hereinafter described, so as to rotate the ratchet-wheel 91 in a direction the reverse to that indicated by the arrow the pawl 96 at a certain part of the revolution will drop into the notch 95, and thereby rotate the disk portion 94 of the cylinder and bring it to position of "0."

Referring now particularly to Fig. 5, the gear 99 on the outer extremity of the shaft 22 engages a gear 100, pivoted on a stud 101, projecting from the side plate 20'. On this stud 101 is loosely mounted a disk 102, having a notch 103, to which disk 102 is secured a gear 104. The shaft 22 also carries a short arm 105, that is normally retained in contact with a stop-pin 106 by a spring 107. The gear 100 has pivoted near its periphery a pawl 108, that by means of a spring 109 is caused to ride on the periphery of the disk 102 and to engage with its notch when in the proper position. The tail of the pawl 108 carries a pin 110, that when the gear 100 travels in the direction of the arrow will strike the arm 105, and thereby trip the pawl from the notch 103. The gear 100 engages a gear 111, mounted on a stud projecting from the side plate 20', which gear carries a gear 112, and the latter gear engages a gear 113, mounted on the outer extremity of a shaft 114, that is rotatably mounted in the side plates. This shaft 114 carries a sleeve 115, (see Fig. 2,) that is mounted to slide axially on the shaft, but prevented from rotating thereon by a spline 116. This sleeve 115 carries four radial arms 117, that are disposed at a distance ninety degrees apart. These arms 117 are arranged the same distance apart axially as the gears 230.

On the shaft 35 are loosely mounted eight arms 118, each having a pin 119 at one side near its free extremity. (See Fig. 6.) One of these arms 118 is located adjacent each of the ratchet-wheels 44'. On each of these arms 118 is pivoted a pawl 120, (see Fig. 7,) arranged to engage the teeth of the ratchet-wheels 44'. This pawl 120 has an arm 121. Four curved guides 122 are arranged to slide on the bars 123 124. A rack-bar 125 is connected to the under side of these guides and extends transversely of the machine. A bar 126 extends from this rack-bar rearwardly and embraces the two rods 123 and 124. The rear extremities of this bar 126 and the four guides 122 are secured together through the medium of collars 127, that slide on the rod 123. Each of these guides carries a curved shield 130, having two portions 131 131', that embrace the T-shaped portion 122' of this guide and slide thereon. (See Fig. 7ª.) These guides are so disposed that the distance apart of each shield center to center is equal to the distance apart of the pawls 120. A shaft 132 is rotatably mounted in the side plates and has a sleeve 133 thereon arranged to move axially, but prevented from rotating on the shaft by a spline 134. This sleeve 133 carries four curved arms 135, arranged in transverse alinement with each other and the same distance apart center to center as are the guides 122, as shown in Fig. 3.

The upper edges of these arms have ratchet-teeth that when the arms are in normal position will engage pawls 136, pivoted on the sides of the part 131' of the shield. The four pawls 42 at the left of the machine each have a curved extension 42', having a lug 42" at its free extension. When one of the latter pawls is in engagement with its ratchet-wheel, this lug 42" will engage a lug 131" on the shield portion 131, and thereby the movement of the pawl in operating its ratchet-wheel will serve to slide the shield on its guide 122. A spring 137, connected to the part 131 of the shield, serves to retract the shield when it is free to move. The arm 121 of the pawl 120 strikes the extremity of the shield 130, when this pawl is moved downward by the arm 118, which will cause the pawl to be disengaged from its ratchet-wheel 44'. It will be observed that when a pawl 42 is thrown out of engagement with its ratchet-wheel 44' the arm 42' will have its lug 42" moved out of the path of movement of the lug 131" on the shield 130. Each arm 117, moving in the direction of the arrow, will strike a pin 119 on the arm 118 and carry this latter arm downward until the arm 117 leaves the pin. Thereupon a counterweight 118', attached to each arm 118, will return the arm to its upper position in contact with a lug 140, secured to a cross-bar 141. The arms 117 are disposed in helical order on the sleeve 115 and in such a manner that the arm to the left hand will first engage an arm 118, and upon the disengagement of said arms 117 and 118 the next arm 117', which is ninety degrees distant, will engage an arm 118 next in order to the right of the arm 118 that has been operated by the said left-hand arm 117, and upon the disengagement of these latter arms the next arm 117' will act in a similar manner, and thereupon the remaining arms will perform the same function.

On the stud 60 is loosely mounted a cam 142, (see Fig. 10,) which is secured to the ratchet and other wheels that are all loosely mounted on this stud. This cam has a portion of its periphery 143 concentric with its axis. Thereupon the periphery increases in diameter a short distance at 144, merging into a concentric portion 145, that extends for a short distance. Thereupon the periphery again increases in diameter at 146 and merges into a concentric portion 147, then a rise 148, then a concentric portion 149, then a rise 150, and then a final concentric portion 151. Thus each step merges into a concentric portion of greater diameter than its preceding one. The final concentric portion in the series has a lug 152. It will be observed that this cam has a notch 153, that is located opposite the cam-surface adjacent the lug 152. A bent lever 160 is pivoted on a stud 161 on the base 20" of the machine and is retained in contact with the cam 142 by spring 162. (See Fig. 3.) The other extremity of the lever 160 has a segment-gear 163, engaging a segment-gear 164, that is secured to a segment-gear 165, pivoted on a stud 166 on the base. This gear 165 engages the rack-bar 125. When the machine is in position to commence a calculation, the end of the lever 160 lies in the notch 153 of the cam 142, and when the rack 57" through the operation of one or more keys has caused the ratchet-wheel 64 to advance the distance of four of its eight teeth the end of the lever 160 will be brought to a position on the cam-surface 143 that is adjacent the cam-surface 144 because of the rotation of the cam; but when the ratchet-wheel 64 is advanced the distance of another tooth the end of the lever 160 will travel up the cam-surface 144 and onto the surface 145, and thereby be moved on its pivot, which will cause the segment-gear 165 to move the rack-bar 123 to the right. These latter parts are so proportioned that by this movement of the rack-bar and the arms 117 connected therewith the latter will be moved a distance equal to the distance apart of the arms 118. This movement of the arms 117 will bring each of them into alinement with an arm 118 to the right of the arm 118 with which it was just in alinement. The next advance of the ratchet-wheel 64 will bring the end of the lever 160 upon the cam-surface 147, which will move the rack again to the right the same distance it was moved by the previous movement of the cam, and thereby bring each of the arms 117 into alinement with an arm 118 to the right of those with which they were just previously in alinement. Another advancement of the ratchet-wheel 64 one notch will effect a similar advancement of the arms 117 in virtue of the lever 160 having its end brought up onto the cam-surface 149, and another such movement of the ratchet-wheel 64 will bring the end of the lever 160 up to the cam-surface 151, and thereby advance the arms 117 the same distance as they moved at each previous step. The lug 152 will prevent the rotation of the cam after the end of the lever 160 has passed over the cam-surface 151. On the said stud 166 is pivoted a lever 167, having one extremity projecting at the front of the machine at its lower portion. The other extremity of the lever 167 carries a lug 168, engaging an annular groove 169 on the notched sleeve. (See Fig. 16.) By the rocking of this lever 167 the notched sleeve 39 will be reciprocated on its shaft 38, and thereby through the arms 170 will move the pawls 42 along the shaft 41. This movement will serve to change the pawls from a position to engage the ratchet-wheels 44 to a position to engage the ratchet-wheels 44', or vice versa.

On the shaft 29, as shown particularly in Figs. 4 and 7, is mounted a bent lever 171, having the key A at its forward extremity. At its rear this lever has a segment-gear 171', that engages a gear 172, mounted on the extremity of the shaft 22. When the key A is depressed, the segment-gear 171 will rotate the gear 172 for one revolution, which will rotate the disks.

On the shaft 132 is secured a arm 173, to which is pivoted a connecting-bar 174, the latter being pivoted to the arm 170. Consequently when the bar 174 is raised by the lever 170 the shaft 132 will be rocked, thus moving the toothed arm 135 out of engagement with its pawl 136, and thereby permitting the spring 137, that is connected between the bar 123 and the shield 131, to move the shield upwardly.

As shown in Fig. 2, the key C is attached to a bent lever 176, pivoted on the shaft 29, having a segment-gear 177, that engages a gear 178, mounted on the left-hand lever 80. When the key C is depressed, this gear will be rotated one revolution, carrying with it the series of sleeves 80 and disks 81 in the direction of the arrow on the latter. These disks when the notch comes to a position to engage with the pawls 85, as shown in Fig. 6, will carry the cylinders 26 26ᴬ, &c., to which these pawls are connected, around for the balance of the revolution; but when the key C is returned to its normal position by retractile spring 179 the disks 81 will evidently rotate in the reverse direction. The disks 80 will move freely under the pawls 85 without disturbing the number-cylinders 26.

The key B at the left of the upper bank is secured to a bent lever 180, pivoted on the outer extremity of shaft 29. This lever 80 has a segment-gear 187 on its rear extremity that engages the said gear 104, secured to the disk 102. A retractile spring 182 serves to return the lever 180 to its normal position after being depressed.

A bar 190 extends between the side plates at the front of the machine and has pivoted thereon a lever 191, that is pivotally connected with the key-bar of the key A by a rod 192. Another lever 193 is also pivoted on this bar 190 and is pivotally connected with the key-bar of the key B by a bar 194. The free end of this lever 193 is arranged to be engaged by the front of the free end of the lever 191. A lever 195 is pivotally mounted on the rock-bar 53, so as to swing rearwardly and also transversely of the machine opposite the key 4 in the lower bank. This lever 195 has a curved arm 195' in engagement with a stop-pin 191' on the free end of the lever 191 and is retained in contact therewith by a spring 196. This lever 195 at its upper straight portion has a short arm 195", extending toward its curved arm. On the free end of the lever 193 is a stop-pin 193', arranged to engage the arm 195" when the lever 193 is rocked, but is of a length to pass downwardly past the curved arm 195' without affecting the latter, which is bent forward slightly at this portion to avoid engagement with this pin.

The bar 171 of the key A has pivoted thereto a bar 197, having a link portion at its other extremity whose slot 198 engages a pin 199 on the key-bar 50 of the key 8 below the key A. Likewise the bar 176 of the key C has pivoted thereto a bar 200, having a link portion 201, whose slot 202 engages said pin 199.

The operation of my machine is as follows: When it is desired to use the machine for addition, the lever 167 must be moved to its full limit to the right, which will bring the pawls 42 in a position to engage with the ratchet-wheels 44', which latter, it will be remembered, operate the number-cylinders 26 26ᴬ through the several intermediate gears. When the pawls 42 are brought to this position, their arms 42' will be moved transversely out of engagement with the shield 131. Suppose it is desired to add the following numbers: "43,875,323" and "68,437,516." The key 4 of the upper bank is first depressed and released. Then the key 3 of the upper bank is pressed and released, and in the same manner the keys of the upper bank corresponding to the remaining digits of this number are pressed and released in their order. When the key 4 was depressed, it went through a certain arc and then struck a step of the step-bar 34 and carried this down for the remainder of the movement of the key-bar, thereby moving the gears 33' and 37 and moving the arms 36 upward. The latter arms will carry the pawls 42 upward and the pawl at the left of the series will engage its ratchet-wheel and through the intermediate gears rotate the number-cylinder a certain distance. This distance is governed by the distance the step-bar 34 is carried downward, the various parts being so proportioned that the depression of the said key 4 will advance the number-cylinder 26 the distance of four numbers—that is, supposing "0" to have been at the top of the cylinder, this movement of key 4 will bring the numeral "4" to the top. This rotation of the number-cylinder 26 is synchronous with the downward movement of key 4; but when the said key 4 is released and is returned by the springs 32 and bars 30 to its position the spring 32'' will retract the pawl-operating arms 36 and through the mechanism hereinbefore described will rock the notched sleeve 39, which latter will throw the left-hand pawl out of engaging position and will bring the next pawl into a position to engage its ratchet-wheel. When the key for the next digit "3" is depressed, it will carry down the step-bar 34 a distance somewhat less than it was carried down by the key 4, and the step-bar will move the said engaging pawl upwardly and rotate the number-cylinder 26ᴬ until the number "3" is at the top. On the return of this key 3 the pawl that has just operated the cylinder 26ᴬ will be thrown out of its engaging position and the next pawl to the right will be brought into position of engagement with its ratchet-wheel. In a similar manner when the key 8 is depressed that number will appear on the number-cylinder 26ᴮ, the next digit "7" will be shown on the cylinder 26ᶜ, and so on till this first number of eight digits reads on these eight number-cylinders. The first number having been put down, thereupon the key 8 of the lower bank is depressed, which through the step-bar 58 and rack-bar 57 and connected parts will serve to rotate the notched sleeve 39 in a direction the reverse of that in which it has been moving and the same distance, so as to return it to its original position at the beginning of this calculation. Thereupon the key 6 of the upper bank corresponding to the first digit to the left in the second number is depressed. In the previous operation it will be remembered that when the key 4 was depressed the number-cylinder 26 was advanced to the number corresponding to that of the key depressed; but as this cylinder has been moved to bring the number "4" at the top, upon the pressing of the key 6 it will be moved the distance of six numbers, which will make a complete revolution of this number-cylinder 26 and bring "0" again to the top; but, as previously described, when any of the cylinders 26 26ᴬ, &c., moved from "9" to "0" the number-cylinder adjacent to the left is advanced the distance of one number. Consequently the number-cylinder 26 will advance the number-cylinder 27 from "0" to "1." The next digit in the second number being "8," this key in the upper bank is now depressed, which will advance the number-cylinder 26ᴬ through a distance of eight of its numbers; but as this cylinder was moved to bring the number "3" to the top it will be now advanced eight more numbers, which will complete its revolution and advance one number on a second revolution, and when this number-cylinder 26ᴬ was moving from "9" to "0" it would advance the adjacent cylinder 26 one additional notch. The cylinder 26 having stopped at "0" when last moved will thus be moved to the position of "1." The next digit being "4" it will be apparent from the above that the cylinder 26ᴮ, that was moved to the position of "8," will be advanced through the balance of a complete revolution and will have the figure "2" exposed at the top; also, this latter number-cylinder on moving from "9" to "0" will advance the cylinder 26ᴬ from "1" to "2," and each of the succeeding digits of this latter number being operated on the upper bank will act in the manner just described, thus giving on the eight cylinders 26 26ᴬ, &c., and cylinder 27 the sum of these two numbers, which is "112,312,839." If there are three or more numbers to be added, the process is exactly the same as just described. When the second number was made with the keys, the sum of these two appeared on the front number-cylinders. Then the third number is treated in like manner by simply pressing corresponding keys in the upper bank, which process will evidently simply add this third number to the sum of the other two numbers, and in precisely the same manner each number down the column is added to the aggregate of the preceeding ones. In this machine I have used eight of these number-cylinders 26 26$^A$, &c., which will add a series of numbers, none of which contain more than eight digits; but by simply multiplying these cylinders with their corresponding keys and intermediate mechanism the capacity of the machine can be increased as desired, or, on the other hand, a less number of cylinders 26, &c., keys, &c., could be used, corresponding to the number of digits in the largest number it is desired to work with. Next, suppose it is desired to add numbers having less than eight digits—for instance, thirty-four thousand and five thousand and eight. The first step in the operation is to find the number of digits in the first number to be added. Then the key in the lower bank corresponding to this number is depressed, which in this instance is 5. This key will depress the step-bar 58 a sufficient distance, and thereby through the connected parts rotate the notched sleeve 39, so as to bring the pawl 42 into operative engagement with the ratchet-wheel connected with the number-cylinder 26$^C$. It will be observed that this cylinder is the fifth one in the series counting from the right, as is the case with this key 5. Thereupon the key 3 of the upper bank is depressed, which will serve to move the pawl 42 upwardly for a distance sufficient to drive a ratchet-wheel and connected number-cylinder three numbers; but as the pawl that operates the cylinder 26$^C$ has been brought into operative position, as just described, this pawl upon the operation of the key 3 of the upper bank will advance the number 26$^C$ and bring its figure "3" to the top. The next digit in the number being "4," by pressing the key 4 of the upper bank the number-cylinder 26$^D$ will be advanced to bring its number "4" to the top, as will be readily understood. The next three digits of this number are naughts; but by inspection of the front row of cylinders it will be seen that this number "34,000" is now shown, and we may proceed to the next number. Every time we start on another number it is necessary to first ascertain the number of its digits and then depress the key bearing that number in the lower bank. Hence we now operate the lower key 4, which, as will be readily understood, will bring the pawl 42, that operates the cylinder 26$^D$, into a position to engage its ratchet-wheel. Thereupon the first digit in this number being "5" we operate key 5 of the upper bank, and consequently move the cylinder 26$^D$ through the space of five of its numbers. As the previous operation of this cylinder brought the figure "4" to the top it will be now advanced to bring "9" to the top. The next digit in the second number being "0," on depressing the "0" key of the upper bank the next number-cylinder will not be advanced, for the reason that nothing is to be added on this cylinder; yet it is necessary to depress this key in order to rock the notched sleeve 39 and throw the pawl that would operate the cylinder 26$^E$ out of its engaging position and the pawl next in order into its position of engagement. The succeeding digits of the second number being "0," the key 0 is again depressed, which will simply throw the pawl, now in position of engagement, out of position and bring the pawl at the right of the machine into position of engagement. Thereupon as the next and last digit is "8" this key is depressed in the upper bank, which will add this number onto the number previously added in the last cylinder 26; but as "0" was left in position by the previous number this cylinder will now have "8" at the top. Instead of the above-mentioned steps in the last process of operating key 0 twice for these two digits in the second number, as an alternative we may depress the key in the lower bank corresponding to the position of the digit "8" of this number—that is, operate key 1 in this bank, which will at once throw out of operative position both the pawl corresponding to the number-cylinder 26$^E$ and the pawl corresponding to the number-cylinder 26$^F$ and will further bring the pawl that operates the cylinder 26$^G$ into its position of engagement. The sum of these two numbers—"39,008"—will now appear on the forward row of cylinders.

When it is desired to use the apparatus for the process of multiplication, the lever 167 is moved to the left, which will move all of the pawls, with their connected parts, to the right and bring them into alinement with the ratchet-wheels 44 instead of the ratchet-wheels 44', as in the process of addition. In the multiplying process the multiplicand is to be shown on the cylinders of the series of the set 23 23$^A$ 23$^B$ 23$^C$ and the multiplier is always put on the cylinders 24 24$^A$ 24$^B$ 24$^C$. The right-hand digit of the multiplicand is always put on the number-cylinder 23$^C$ and the other digits of the multiplicand on the cylinders to the left in their proper sequence. Likewise the right-hand digit of the multiplier is always put on the cylinder 24$^C$ and the other digits in order on the three cylinders to the left. Suppose it is desired to obtain the product of thirty-five multiplied by forty-six. From the preceding we must place the digit "3" on the cylinder 23$^B$, which is done by first depressing the key in the front row whose position in its bank corresponds to the position of this cylinder 23$^B$ in the rear line of cylinders, in this instance key 6. This will result in bringing the proper pawl 42 into position of engagement with its ratchet-wheel to operate the number-cylinder 23$^B$. Thereupon the key 3 of the upper bank is operated, which will move this number-cylinder 23$^B$ from "0" to "3" through the medium of one of the pawls 42; but during this movement of the pawl its lug 42' was in engagement with the lug on the shield 131 that is opposite the arm 117' and would draw this shield down for a certain distance, and the latter would be retained in this position by the pawl 136 engaging one of the teeth on the arm 135. Since the pawl and shield move together, the distance the shield is carried is relative to the distance the number-cylinder is advanced by the pawl. Thereupon the key 5 of the upper bank is operated, which will rotate the cylinder 23$^C$ until the number "5" appears at the top through the medium of a pawl 42 next to the right of the one that was last referred to. The movement of this pawl will move the shield opposite the arm 117 through a distance proportionate to the distance this latter pawl has moved the number-cylinder 23$^C$. Next the multiplier "46" is put upon the cylinders 24. There being two digits in this number, the first one to the left must be put on the number-cylinder 24$^B$. This is done by first pressing the key in the lower bank corresponding in position to that of this number-cylinder—that is, the key 2—which will bring a pawl 42 into position to actuate, through intermediate gears, this cylinder 24$^B$. When at the beginning of this process of multiplication the key 6 was operated, the cam 142 was rotated through three-eighths of a complete revolution, and when the key 5 of the lower bank was operated the cam 142 is advanced one-eighth of its complete revolution and the extremity of the lever 160 has moved relative to the cam-surface to a position adjacent the first step 145 of the cam. During this half-revolution of the cam, since the extremity of the lever 160 remained at the same distance from the axis of the cam and the carriage constituted by the several shields and guides, the arms 117, &c., have not been changed relative to the shaft 114, and when the key 2 is pressed, as above described, this cam will be advanced three-eighths of a revolution and cause the engaging portion of the lever 160 to ascend three steps of the cam onto the cam-surface 149. Now each step that this end of the lever was caused to ascend would move the lever away from the axis of the cam and cause it to slide the carriage to the right for such a distance that will move the shield from a position adjacent one of the arms 118 to the next one to the right. Having just moved three steps, the shield adjacent the arm 117, that at the former position was in a position of engagement with the number-cylinder 26$^C$ through intermediate parts, is thereby brought into a position of engagement with the number-cylinder 26$^F$ through intermediate parts. As just stated, the shield opposite the arm 117 has been brought into alinement with the gear 43, that indirectly engages the number-cylinder 26$^F$; but when the figure "5" was set on the cylinder 23$^C$ it will be remembered that the shield opposite the arm 117 had been moved downwardly a certain distance proportionate with the movement of this cylinder to set figure "5." The movement that brought this shield in operation relative to the cylinder 26$^F$ would evidently bring the adjacent shield opposite the arm 117' in operative relation with the gear 43 connected with the cylinder 23$^B$, and this last-mentioned shield, as previously stated, was moved downwardly for a certain distance proportionate with the movement of the pawl 42. It is now in order to set the digit "4" of the multiplier on the number-cylinder 24$^C$, which is done by pressing key 4 in the upper bank. Now when this key 4 is depressed it will rotate the cylinder 24$^B$, as hereinbefore described, through a distance of four numbers, and as when any of the four cylinders 24 24$^A$, &c., are rotated one number they will rotate the arms 117 (see Fig. 5) one revolution, these arms will now make four revolutions upon the completion of the depression of this key 4. At the beginning of this rotation of the arm 117, and the arm 117' will move the arm 118 adjacent downwardly and the ratchet 120 will rotate the adjacent wheel 44', until the arm 121 of this pawl strikes the adjacent shield 131, which will throw the said pawl 120 off from its ratchet-wheel and hold it off for the balance of the movement of this arm 118; but this shield 131 has been so positioned by its coöperative pawl 42 when the latter was moved upwardly to set the digit "3" of the multiplicand that this said movement of the ratchet-wheel 44' will, through intermediate gears, move the cylinder 26$^F$ the same distance of revolution that the cylinder 23$^B$ moved and will set this cylinder 26$^F$ with the number "3" at the top. Now the arm 117, that is set ninety degrees rearwardly in the direction of revolution of the arm 117' when the latter arm has advanced ninety degrees, will engage its coöperative arm 118, and the latter will, through its attached pawl 120, rotate the adjacent wheel 24' until the pawl is thrown out by the adjacent shield 131; but this latter shield has been moved downwardly such a distance when the adjacent pawl 42 was operated to bring the number "5" on the cylinder 23$^C$ to the top that this pawl will be tripped when it shall have rotated its gear 44' a sufficient distance to rotate the cylinder 26$^E$ a distance of five figures. Upon the second revolution of the arms 117 117' these two processes just described are repeated in the same sequence—that is to say, the cylinder 26$^E$ is advanced again for a distance of three figures, which will bring figure "6" to the top, and the arms continuing this revolution the cylinder 26$^F$ will be advanced the same distance as before and be moved five additional spaces, which will bring it to the "0" position and advance the left-hand adjacent cylinder one figure, and these two number-cylinders will read "70." In a similar manner the third complete revolution of the arms will add thirty-five to the "70," thus bringing "105" on the number-cylinders 26$^D$ 26$^E$ 26$^F$, and as the arms 117 were revolved four times, thirty-five will be once more added, thus bringing "140" at the top of the number-cylinders. When the key 4 is returned to its normal position, the cam 142 will be advanced one notch, which will result in the movement of the arms 117 and the several shields 131 to the right and bring the shield opposite the arm 117 into engagement with the arm 118 in coöperative position with the number-cylinder 26ᴳ and obviously the shield 117' into coöperative position with the number-cylinder 26ᶠ. The next step in the process is to place the other digit "6" of the multiplier on the number-cylinder 24ᶜ, which is done by depressing the key 6 in the upper bank. When this key 6 is depressed, the cylinder 24ᶜ is rotated a distance of six figures and the arms 117 caused to make six revolutions. In its first revolution the arm 117' will, through the arm 118 now adjacent and the pawl 120 and the ratchet 44', serve to rotate the cylinder 26ᶠ a distance of three numbers, since its adjacent shield remains set in the position previously described. The succeeding part of this revolution will cause the arm 117 to move the cylinders 26ᴳ the distance of five numbers; but these two cylinders 26ᶠ and 26ᴳ having each been left at the position of "0" at the completion of the previous step, these two number-cylinders will now read "35" and the four cylinders to the right in this series will register "1,435." Upon the next revolution of the arms 117 the cylinder 26ᶠ will again move three figures and the cylinder 26ᴳ a distance of five figures, which will evidently add thirty-five on the registering-cylinders, thus setting them at "1,470." Likewise the third revolution will add thirty-five and register the number "1,505." And the completion of the sixth of these revolutions, the number "1,610" will evidently appear on the said four cylinders, which is the product of thirty-five and forty-six. It will be seen that this multiplicand thirty-five was, in fact, first multiplied by a number constituted of the first digit to the left, a number of naughts corresponding to the remaining digits of the multiplier—in other words, forty—which by the simple operation of depressing the key 4 after the multiplicand had been registered brought the product "1,440" in the front row of cylinders, and, secondly, the multiplicand is multiplied by the remaining digit of this multiplier—that is, "6"—and at the same time this product is added to the said product, which will evidently give the true product of these two numbers. In a like manner when it is desired to multiply two numbers of four digits each the multiplicand is first set up on the cylinders 23, 23ᴬ, &c., and then the multiplier is set up on the cylinders 24, 24ᴬ, &c., and this will upon the setting up of the last multiplier have registered the product of these two numbers on the front row of number-cylinders. This last operation is accomplished, broadly speaking, by first multiplying the multiplicand by a number constituted of the digit at the left of the multiplier, with three naughts at its right. Thereupon the multiplicand is multiplied by a number composed of the second digit from the left in the multiplier and two naughts to its right, and this product is added at once to the product just obtained and this sum registered on the front row of cylinders. Nextly, the multiplicand is multiplied by a number composed of the third digit from the left, having a naught to its right, which product is added to the aggregate of the preceding product, and finally the multiplicand is multiplied by the remaining digit of the multiplier and this latter product at once added to the aggregate of the above three products, which will evidently be the product of the said two numbers. Next, suppose it was desired to add to the last-mentioned product the product of the said multiplicand and any number of not greater than four digits. In this case all that is necessary is to bring the four cylinders 24 24ᴬ 24ᴮ 24ᶜ with "0" at the top. Thereupon the new multiplier is caused to be shown on the set of cylinders 24 24ᴬ, &c., as in the previous operation, which will not only multiply the multiplicand by this new multiplier, but will add the product thereof to the product obtained in the preceding operation, and, if desired, the same multiplicand may be multiplied by a third multiplier and this latter result added to the result of the preceding operation and likewise any number of multipliers in succession may be caused to add their product to that of a preceding operation.

Next, suppose it is desired to do a problem in division—for instance, we have a divisor of one hundred and sixty-five and a dividend of two hundred and three thousand eight hundred and seventy-five. We first move the lever 160 to the left-hand position. The number-cylinders being all at "0," we set the divisor upon the cylinders 23 23ᴬ 23ᴮ 23ᶜ by first pressing the key in the lower bank corresponding in position to the relative position of this number-cylinder 23ᶜ in the rear series of cylinders, in this instance key 7, and then the three keys corresponding to the three digits in this divisor are pressed, reading it from left to right. This operation, it will be seen, is identical to placing that of a multiplicand on cylinders 23, &c., as described in the above problem of multiplication. Here, as was described in the process of multiplication, the carriage having the bars 117 and the shields 131 was moved to the right by the cam at the latter part of the operation of the key 5 in setting up the divisor, which will put the shields that have been set when the said keys 1, 6, and 5 were operated in a position of engagement with the cylinders 26ᴮ 26ᶜ 26ᴰ. We now compare the divisor with the number constituted by the first three digits of the dividend at the left, as is always done in the process of division in arithmetic. If we think that the divisor will go once into this number, we depress key 1 in the upper bank, which will, in fact, multiply the divisor by one thousand and through the operation of the three shields above mentioned set up "165" on the three cylinders 26ᶜ 26ᴰ 26ᴱ; but if it is thought that possibly the divisor would be contained in the number "203" twice instead of pressing key 1 of the upper bank we would operate key 2, and thereby, in fact, multiply one hundred and sixty-five by two thousand, which would bring "230" on the same three cylinders 26$^C$ 26$^D$ 26$^E$; but this we see is too great. Hence we must reset the cylinders 26, &c., and also the cylinders 24, &c., all at "0," and then again place figure "1" on the number-cylinder 24, and thereby again place the number "165" on the number-cylinders 26$^C$ 26$^D$ 26$^E$. The next step is to find the succeeding digit to the right in the quotient and cause it to appear on the cylinder 24$^A$. We first press key 1 of the upper bank, which will multiply the divisor by one hundred, and add this product ("1,650") to the number "16,500" just placed on the cylinders of the front row, which will bring "18,150" on the cylinders 26$^C$ 26$^D$ 26$^E$ 26$^F$ 26$^G$. Still holding this key down, we compare the number "1,815" with "2,037," it will appear probable that the difference is greater than the divisor. We then try the next higher number on the cylinder 24$^A$ by depressing the key 2 without releasing the key 1, which will evidently add the divisor to the number last set up on the front series of cylinders, and if this is a number not one hundred and sixty-five less than the said number "2,037" then "2" is the next figure in the quotient; but if the said difference between the resultant number and "2,037" were greater than the number "165" then still retaining the key 2, last depressed, we operate succeeding keys in the same manner until we obtain a number on the front cylinders not one hundred and sixty-five less than "2,037" and then release the depressed keys. The next step is to place the succeeding figures in the quotient on the cylinder 24$^B$. As in the preceding case, we press the keys in the upper bank in numerical order until we obtain a number on the front row of cylinders that is not one hundred and sixty-five less than the number "20,377" and then release the depressed keys. In precisely the same manner we operate the keys of the upper bank until we obtain a number on the front row of cylinders equal to this number "203,775" or a number not one hundred and sixty-five less than this number. When it is desired to reset the front row of cylinders, the key C is depressed, which, operating a gear 178, will rotate the disk 220 a complete revolution, which, it will be remembered, will cause their notches 221 to engage with the pawls 232, connected with the cylinders, and thereby carry them around until each registers "0;" but as key C is connected with key 8 of the lower bank that key will be operated, which will result in rotating the notched sleeve 39 until the pawl 32 at the left hand is brought into operative position, and will also result in bringing the carriage carrying the shields and connected parts to their extreme left-hand position through the medium of link 199. When it is desired to reset the cylinders 23 23$^A$ 23$^B$ 23$^C$, the key A is operated, which will bring each of these four cylinders to the position of "0." If the carriage supporting the shields and connected parts had not been brought to its extreme left-hand position by the previous operation, this will be accomplished through the medium of the link 197. When this key 8 is depressed, it will rock the shaft 182 through the connecting-bar 174. (See Fig. 4.) This latter movement, as shown in Fig. 7, will move the notched arm 195, and thereby release the shields, that will be returned to their former position, as hereinbefore described. This operation of key A will also rock the lever 190 and through the bar 192 will operate key B. When it is desired to reset the four number-cylinders 24, &c., the key B is depressed, which will move the segment-gear 181, and thereby rotate the disk 102 in a direction to engage the pawl 108, which will operate gears 100 and 99 and rotate the sleeve 90. These sleeves, as previously described, will bring these number-cylinders 24, &c., around to "0." The operation of key B will also rock the bar 193, and thereby, as above described with reference to Fig. 11, will operate key 4 of the lower bank. The object of this is to reset the four cylinders 24, &c., that register the multiplier, without disturbing the numbers that are registered on the cylinders 23, &c., that indicate the multiplicand.

Having thus described my invention, what I claim is—

1. In a calculator, the combination of a series of digit-indicators; a set of ratchet-wheels; means for causing each of the indicators to be driven from one of the ratchet-wheels; a shaft having a series of pawls thereon; each pawl being disposed in alinement with one of said ratchet-wheels; a set of digit-keys; means for causing the operation of any of said keys to move the pawl-carrying shaft and thereby so move an indicator that the latter registers the digit of the operating-key; and means for bringing any desired pawl into position of engagement with its ratchet-wheel to operate the connected indicator.

2. In a calculator, the combination of a series of digit-indicators; a set of ratchet-wheels; means for causing each of the indicators to be driven from one of said ratchet-wheels; a shaft having a series of pawls thereon; each pawl being disposed in alinement with one of said ratchet-wheels; a set of digit-keys; a rotatable sleeve connected with said shaft and arranged to rock the pawls in succession; means for rotating the sleeve and thereby bring any desired pawl into position of engagement with its ratchet-wheel to operate the connected indicator; and means for causing the operation of any of said keys to move the pawl-carrying shaft and thereby operate an indicator so that the latter registers the digit of the operating-key.

3. In a calculator, the combination of a series of digit-indicators; a set of ratchet-wheels;

means for causing each of the indicators to be driven from one of the ratchet-wheels; a shaft having a series of pawls, each pawl being disposed in alinement with one of said ratchet-wheels; a set of digit-keys; a rotatable sleeve connected with said shaft and arranged to engage the pawls; said sleeve having a helical series of notches each located at a pawl-engaging portion of the sleeve; means for rotating the sleeve, and thereby bring any of the notches into engagement with its pawl and place the latter in position to operate the connected indicator; and means for causing the operation of any of the said keys to move an indicator so that the latter registers the digit of the operated key.

4. In a calculator, the combination of a series of digit-indicators; a set of ratchet-wheels; means for causing each of the indicators to be driven from one of said ratchet-wheels; a shaft having a series of pawls thereon, each pawl being disposed in alinement with one of said ratchet-wheels; a set of digit-keys; a rotatable sleeve connected with the shaft and arranged to rock the pawls in succession; a second set of keys; means for causing the operation of each latter key to rotate the sleeve and thereby bring a pawl into position of engagement to operate the indicator corresponding to the latter key operated; and means for causing the operation of any of the said digit-keys to move the pawl-carrying shaft and thereby move an indicator so that the latter registers the digit of the operating-key.

5. In a calculator, the combination of a series of digit-indicators; a set of ratchet-wheels; means for causing each of the indicators to be driven from one of the ratchet-wheels; a shaft having a series of pawls thereon, each pawl being disposed in alinement with one of said ratchet-wheels; means for bringing any desired pawl into engagement with its ratchet-wheel; a pair of levers; means for causing the levers to rock said pawl-carrying shaft; a step-bar connecting said levers; a set of movable digit key-bars; means for retaining the key-bars normally in alinement; the key-bars being so disposed as to engage respectively the steps of the step-bar and thereby rock said levers.

6. In a calculator, the combination of a series of digit-indicators; separate means for moving each of the indicators and cause it to register any digit; a pair of levers; a step-bar connecting said levers; a set of key-bars, each having a gear thereon; means for retaining the key-bars normally in alinement; a rock-bar located opposite each key-bar and having a gear thereon; the said gear on each key-bar engaging the gear on the opposite rock-bar; said step-bar being located between the set of key-bars and the set of rock-bars, with the steps disposed to be each engaged by a key-bar and its opposite rock-bar; a set of digit-keys; one of said levers being arranged to cause any one of said indicator-moving means to be operated by any of said digit-keys when operated, and thereby register the digit of the operated key.

7. In a calculator, the combination of a series of digit-indicators; a set of ratchet-wheels; means for causing each of the indicators to be driven from one of the ratchet-wheels; a shaft having a series of pawls thereon, each pawl being disposed in alinement with one of said ratchet-wheels; a rotatable sleeve connected with said shaft and arranged to rock the pawls in succession; a gear on said sleeve; a pair of levers; means for causing one of said levers to rotate said gear; a step-bar connecting said levers; a set of key-bars, each having a gear thereon; means for retaining the key-bars normally in alinement; a rock-bar located opposite each key-bar and having a gear thereon; the said gear on each key-bar engaging the gear on the opposite rock-bar; said step-bar being located between the set of key-bars and the set of rock-bars with the steps disposed to be each engaged by a key-bar and its opposite rock-bar; a set of digit-keys; and means for causing the operation of any of said latter keys to move the pawl-carrying shaft and thereby operate an indicator so that the latter registers the digits of the operating-key.

8. In a calculator, the combination of a series of digit-indicators; a set of ratchet-wheels; means for causing each of the indicators to be driven from one of the ratchet-wheels; a pair of pivoted arms; a shaft carried by the free extremity of said arms; a series of pawls mounted on said shaft; each pawl being disposed in alinement with one of said ratchet-wheels; a rotatable sleeve mounted on said shaft; means on the sleeve for rocking said pawls in succession upon the rotation of the sleeve; a set of digit-keys; means for causing the depression of any of said keys to rock said arms and thereby cause a pawl to move a ratchet-wheel and operate an indicator; and means for causing the return movement of said arms and pawls upon the release of a depressed key, to rotate said sleeve and thereby move the pawl just operated away from its engaging ratchet-wheel, and also move the adjacent pawl into position to engage its ratchet-wheel.

9. In a calculator, the combination of a series of digit-indicators; a set of ratchet-wheels; means for causing each of the indicators to be driven from one of the ratchet-wheels; a pair of pivoted arms; a shaft carried by the free extremity of said arms; a series of pawls mounted on said shaft; each pawl being disposed in alinement with one of said ratchet-wheels; a rotatable sleeve mounted on said shaft and arranged to bring successive pawls into position of engagement; a pivoted lever having a pawl mounted thereon; a ratchet-wheel arranged to engage said pawl; a gear mounted on said sleeve; a pin-wheel connected with said ratchet-wheel and normally in engagement with said sleeve-gear; a second pivoted lever having a notched portion arranged to engage one extremity of said lever; the first-mentioned lever being arranged to bring its extremity into engagement with the notched portion of the second lever; the second lever having its extremity disposed so as to be moved by one of said arms on the return movement of the latter after having operated one of its supporting-pawls, and thereby cause the first lever to be tripped from said notch; means for moving the first lever in a reverse direction; said pawl and ratchet-wheel being so arranged that on the said reverse movement of said first lever the pawl engages and moves its ratchet-wheel, and thereby rotates the sleeve to bring an adjacent pawl into position of engagement; a set of digit-keys; and means for causing the depression of any of said keys to rock said arms and connected pawl and operate an indicator.

10. In a calculator, the combination of a series of digit-indicators; a set of ratchet-wheels; means for causing each of the indicators to be driven from one of the ratchet-wheels; a set of digit-keys; means for causing the depression of any of said keys to rock said arms and pawls and cause a ratchet-wheel to move an indicator; a pair of pivoted arms; a shaft carried by the free extremity of said arms; a series of pawls mounted on said shaft, each pawl being disposed in alinement with one of said ratchet-wheels; a rotatable sleeve mounted on said shaft; and arranged to bring successive pawls into position of engagement; a pivoted lever having a pawl mounted thereon; a ratchet-wheel arranged to engage said pawl; a gear mounted on said sleeve; a pinwheel connected with said ratchet-wheel, and normally in engagement with said sleeve-gear; a second pivoted lever having a notched portion arranged to engage one extremity of said lever; the first-mentioned lever being arranged to bring its extremity into engagement with the notched portion of the pivoted lever; a second lever having its extremity disposed so as to be moved by one of said arms on the return movement of the latter after having operated one of its supporting-pawls and thereby cause the first lever to be tripped from said notch; means for moving the lever in a reverse direction; said pawl and ratchet-wheel being so arranged that on the said reverse movement of said first lever the pawl engages and moves its ratchet-wheel, and thereby rotates the sleeve to bring an adjacent pawl into position of engagement; means for causing the operation of any of said keys to rock said first lever and thereby cause the sleeve to bring an adjacent pawl into position of engagement.

11. In a calculator, the combination of a shaft; a series of sleeves loosely mounted on said shaft and secured together; a series of digit-cylinders each having a disk portion; means for causing the digit-cylinders to register any desired digit; each disk being loosely mounted on one of said sleeves; a second disk secured to each of said sleeves and having a notch in its periphery; a ratchet-wheel secured to said second disk; a pawl pivoted on the first disk and arranged to engage said second disk on an adjacent cylinder at its notched portion, and to also engage the adjacent ratchet-wheel; a gear on each of said cylinders; means for rotating each of said cylinders; said disk being arranged to normally hold the pawl from engaging the adjacent ratchet-wheel; said disk having its notch arranged to permit the pawl when traveling in a certain direction to engage a tooth when rotated and thereby move the ratchet-wheel and attached cylinder for one-tenth of a revolution, and thereupon force the pawl from engagement with the ratchet-wheel; said disk having its notch also arranged to engage the pawl when the latter is moving in the same direction and be carried around with it.

12. In a calculator, the combination of a shaft; a series of sleeves loosely mounted on said shaft and secured together; a series of digit-cylinders each having a disk portion; means for causing the cylinders to register any desired digit; each disk being loosely mounted on said sleeves; a second disk secured to each of said sleeves and having a notch in its periphery; a ratchet-wheel secured to said first disk; a pawl pivoted on the first disk and arranged to engage said second disk on an adjacent cylinder at its notched portion and to also engage the adjacent ratchet-wheel; a gear on each of said cylinders; means for rotating each of said cylinders; said disk being arranged to normally hold the pawl from engaging the adjacent ratchet-wheel; said second disk having its notch arranged to permit the pawl when traveling in a certain direction to engage a tooth when rotated, and thereby move the ratchet-wheel and attached cylinder for one-tenth of a revolution, and thereupon force the pawl from engagement with the ratchet-wheel; said second disk having its notch also arranged to engage the pawl when the latter is moving in a certain direction and be carried around with it; a gear secured to said sleeve; and a pivoted key-bar having a segment-gear arranged to engage said gear and rotate it one revolution on the depression of the key-bar, and thereby cause the said sleeve and disks to engage with the registering-cylinders and move them through the balance of a revolution.

13. In a calculator, the combination of a series of digit-indicators; a set of ratchet wheels; means for causing each of the indicators to be driven from one of the ratchet-wheels; a pair of pivoted arms; a shaft carried by the free extremities of said arm; a series of pawls mounted on said shaft, each pawl being disposed in alinement with one of said ratchet-wheels; a set of digit-keys; means for causing the depression of any of said keys to bring a pawl to move a ratchet-wheel and thereby move an indicator; means for returning all of said indicators to "0;" and means for causing said latter operation to throw all of the pawls out of engagement with the ratchet-wheels.

14. In a calculator, the combination of a series of digit-indicators; a set of ratchet-wheels; means for causing each of the indicators to be driven from one of the ratchet-wheels; a shaft having a series of pawls thereon; each pawl being disposed in alinement with one of said ratchet-wheels; a set of digit-keys; a rotatable sleeve connected with said shaft and arranged to rock the pawls in succession; means for causing the operation of any of the keys to move the pawl-carrying shaft and thereby move an indicator so that the latter registers the digit of the operating-key; means for rotating the sleeve and thereby bring any desired pawl into position of engagement with its ratchet-wheel to operate the connected indicator; means for returning all said indicators to "0;" and means for causing said latter operation to move said sleeve and thereby throw all the pawls out of position of engagement with their ratchet-wheels.

15. In a calculator, the combination of a set of indicators; a second set of indicators; a plurality of digit-keys; means for causing the operation of said keys to register a certain number on the first set of indicators; means for causing the operation of said keys to register a certain number on the second set of indicators; a third set of indicators; and means for causing the operation of the keys that caused these two numbers to be registered to automatically register the product of the two said numbers on the third set of indicators.

16. In a calculator, the combination of a set of indicators; a second set of indicators; a plurality of digit-keys; means for causing the operation of said keys to register a certain number on the first set of indicators; means for causing the operation of said keys to register a certain number on the second set of indicators; a third set of indicators; and means for causing the operation of the keys that caused these two numbers to be registered to automatically register the product of the two said numbers on the third set of cylinders; means for setting the second set of indicators at "0;" and means for causing the act of again setting up a number on the second set of indicators, when reset, without disturbing the other registered number or the said product, to cause the product of the said number registered on the first set of indicators by the number last registered on the second set of indicators, to be automatically added to the said product, thereby registering the sum of the two products on the third set of indicators.

17. In a calculator, the combination of a set of digit-indicators; means for causing any of the indicators to register any digit; a second set of digit-indicators; means for causing any of the latter indicators to register any digit; a third set of digit-indicators; and means for causing the operation of registering a digit on the second set of indicators, when a digit has been registered on any of the first set of indicators, to automatically move one of the indicators in the third set through a number of its digit-spaces equal to the product of the number of digit-spaces through which the first said indicator moved to register the said number, multiplied by the number of digit-spaces through which the second indicator moved to register the second number.

18. In a calculator, the combination of a set of digit-indicators; means for causing any of the indicators to register any digit; a second set of indicators; a third set of indicators; means for causing any of the second set of indicators to register any digit; and means for causing the movement of one of said second indicators through each of its digit-spaces, when a digit has been registered on the first set of the indicators, to automatically move one of the third set of indicators through a number of digit-spaces equal to the digit that was caused to register on a digit-indicator of the first set.

19. In a calculator, the combination of a set of digit-indicators; means for causing the indicators to register any digit; a second set of indicators; a third set of indicators; means for causing any of the second set of indicators to register any digit; and means for causing the movement of any one of the second indicators through each of its digit-spaces, when a number has been registered on the first set of indicators, to automatically move a plurality of adjacent indicators in the third set, equal in number to the digits of said number, each through a number of digit-spaces equal respectively to the digit corresponding in order in the said number.

20. In a calculator, the combination of a set of digit-indicators; means for causing the indicators to register a given number; a second set of digit-indicators; a third set of digit-indicators; means for causing the second set of indicators to register a given number; means for causing the act of registering the left-hand digit of a number, on the second set of indicators, when a number has been registered on the first set of indicators, to automatically register on the third set of indicators, the product of the first number by a number composed of the said left-hand digit with the remaining digits of the number replaced by naughts.

21. In a calculator, the combination of a set of indicators; a second set of indicators; a plurality of digit-keys; means for causing the operation of said keys to register a certain number on the first set of indicators; means for causing the operation of the said keys to register a certain number on the second set of indicators; a third set of indicators; means for causing the operation of the keys that caused these two numbers to be registered, to automatically register the product of the said two numbers of the third set of indicators; means for setting the second set of indicators at "0;" and means for causing the act of again setting up a number on the second set of indicators when reset, without disturbing the other said number, or the said product, to cause the product of the said number on the first set of indicators by the number last caused to register on the second set of indicators, to be automatically added to the said product, thereby registering the sum of the two products on the third set of indicators; said latter means being arranged to the operation of resetting and registering of subsequent numbers on the second set of indicators to multiply the first number by these numbers and add the product in each instance to the aggregate of the preceding products.

22. In a calculator, the combination of a set of digit-indicators; means for causing the indicators to register a given number; a second set of digit-indicators; a third set of digit-indicators; means for causing the second set of indicators to register a given number; operating means for causing the act of registering the left-hand digit on the second set of indicators, when a number has been registered on the first set of indicators, to automatically register on the third set of indicators the product of the said first number by a number composed of the said left-hand digit with the remaining digits of the number replaced by naughts; said operating means being also arranged to cause the registering of the next digit of the said number to multiply the first number by a number composed of the latter digit with the remaining digits to the right in the said number replaced by naughts, and adding this latter product to the said product, causing their sum to replace the said product on the third set of indicators; and means for causing the registering of the remaining digits of the second number to likewise multiply the first number by the digit with as many naughts as there are remaining digits to the right in the number, and adding their products to the aggregate of the preceding products, thereby causing the product of the first number by the second number to be registered on the third set of indicators.

23. In a calculator, the combination of a series of digit-indicators; a set of ratchet-wheels; means for causing each of the indicators to be driven from one of the ratchet-wheels; a shaft having a series of pawls slidable thereon but rotatable therewith; each pawl being disposed in alinement with one of said ratchet-wheels; a set of digit-keys; means for causing the operation of any of said keys to move the pawl-carrying shaft and thereby so move an indicator that the latter registers the digit of the operating-key; and means for bringing any desired pawl into position of engagement with its ratchet-wheel to operate the connected indicator; a second series of digit-indicators; a second set of ratchet-wheels; means for causing each of the latter indicators to be driven from one of said latter ratchet-wheels; and means for bringing said pawls into position to operate either of said sets of ratchet-wheels.

24. In a calculator, the combination of a series of digit-indicators; a set of ratchet-wheels; means for causing each of the indicators to be driven from one of the ratchet-wheels; a shaft having a series of pawls slidable thereon but rotatable therewith; each pawl being disposed in alinement with one of said ratchet-wheels; a set of digit-keys; means for causing the operation of any of said keys to move the pawl-carrying shaft and thereby so move an indicator that the latter registers the digit of the operating-key; and means for bringing any desired pawl into position of engagement with its ratchet-wheel to operate the connected indicator; a second series of digit-indicators; a second set of ratchet-wheels; means for causing each of the latter indicators to be driven from one of said latter ratchet-wheels; and means for sliding said pawls on said shaft to bring them opposite either of said sets of indicators.

25. In a calculator, the combination of a series of digit-indicators; a set of ratchet-wheels; means for causing each of the indicators to be driven from one of said ratchet-wheels; a shaft having a series of pawls thereon, each pawl being disposed in alinement with one of said ratchet-wheels; a set of digit-keys; a rotatable sleeve connected with said shaft and arranged to engage the pawls; means on the sleeve for rocking the pawls in succession; a second set of keys, one for each of the indicators; means for causing the operation of each latter key to rotate the sleeve and thereby bring a pawl into position of engagement to operate the indicator corresponding to the latter key operated; means for causing the operation of any of the said digit-keys to move the pawl-carrying shaft and thereby move an indicator so that the latter registers the digit of the operating-key; and means for reciprocating said pawls and sleeves to bring them opposite either set of ratchet-wheels.

26. In a calculator, the combination of a series of digit-indicators; means for causing the indicators to register; means for returning the indicators to "0;" a second set of digit-indicators; means for causing the latter indicators to register; means for returning the second set of indicators to "0;" and means for causing said latter means to operate said former returning means.

27. In a calculator, the combination of a set of digit-keys; a series of digit-indicators; means for causing the operation of each of the keys to actuate any of the indicators and thereby register the digit of the operating-key; and means actuated on the operation of a said key for causing the succeeding operation of a said key to move an indicator adjacent the indicator last operated and thereby register the digit of the latter key; the series of indicators being divided into two sets; means for returning one set of indicators to "0" without disturbing the other set of indicators; and means for causing the said latter operation to cause the succeeding operation of any of said keys to register its digit on an indicator of the set returned to "0."

28. In a calculator, the combination of a shaft; a series of sleeves loosely mounted on the shaft and secured together; a ratchet-wheel on each sleeve; a series of digit-cylinders each having a ratchet-wheel secured thereto and also having a notched disk; a gear mounted loosely on each of said sleeves and located between each of said cylinders; a pawl on each of said gears, and arranged to engage the ratchet-wheel of a cylinder and to also engage the ratchet-wheel of an adjacent sleeve; a pawl on each of the sleeve ratchet-wheels and arranged to engage said notched disks; said first-mentioned pawl being arranged to rotate an adjacent cylinder on the operation of its supporting-gear and to also rotate the series of sleeves; said pawls on the sleeve-disk being arranged to each engage the notch on its adjacent disk on the rotation of said sleeves and thereby bring all of the cylinders to "0."

29. In a calculator, the combination of a series of digit-indicators; means for causing any of the indicators to register any digit; a wheel connected with said indicators; and means for causing the rotation of each of the indicators to rotate said wheel for a distance proportional to the number of digit-spaces through which the indicator moves.

30. In a calculator, the combination of a series of digit-indicators; means for causing any of the indicators to register any digit; a wheel connected with said indicators; means for causing the registering of any of the indicators to rotate said wheel for a distance proportional to the number of digit-spaces through which the indicator moved; and means for causing the rotation of said wheel in a direction the reverse of that in which it was moved by the indicators, to bring all of said indicators to the position of "0."

31. In a calculator, the combination of a set of digit-indicators; a second set of digit-indicators; a third set of digit-indicators; a set of ratchet-wheels; means for causing any of the first and second set of digit-indicators to be driven from one of said ratchet-wheels; a shaft having a series of pawls thereon; each pawl being in alinement with one of said ratchet-wheels; a set of digit-keys; means for causing the operation of each of the keys to move the pawl-carrying shaft a distance proportional to the digit of the operating-key; means for bringing any desired pawl into position of engagement with its ratchet-wheel; a second shaft; a series of gears mounted on said second shaft and each arranged to operate an indicator of the third set; a ratchet-wheel connected with each of said gears; a lever loosely mounted on said second shaft adjacent to each of said gears; a pawl pivoted on each of said levers and arranged to engage one of the latter ratchet-wheels; an extension on each latter pawl; a third shaft; a sleeve arranged to slide on the third shaft but rotated thereby; a carriage arranged to move said sleeve axially when reciprocated; a series of arms on said sleeve each arranged to engage and move one of said levers on the rotation of the sleeve and thereby cause the pawls on these levers to rotate their ratchet-wheels and move the third set of indicators; a series of movable shields mounted on said carriage and arranged to engage the extensions of said pawls respectively and normally hold these pawls out of engagement; the pawls that operate the first set of indicators each having an arm thereon arranged to engage one of said shields and move it a certain distance to permit a lever-carried pawl to engage its ratchet-wheel, and when moved by a said arm move an indicator a number of spaces equal to the digit of the key depressed to operate a pawl of the first set; and means for causing the operation of any of the second set of indicators to rotate said third shaft and cause said arm-carrying sleeve to rotate and thereby rock the pawl-carrying arms once for each movement of the latter indicator through one space.

32. In a calculator, the combination of a set of digit-indicators; a second set of digit-indicators; a third set of digit-indicators; a set of ratchet-wheels; means for causing any of the first and second set of digit-indicators to be driven from one of said ratchet-wheels; a shaft having a series of pawls thereon, each pawl being in alinement with one of said ratchet-wheels; a set of digit-keys; means for causing the operation of each of the keys to move the pawl-carrying shaft a distance proportional to the digit of the operating-key; means for bringing any desired pawl into position of engagement with its ratchet-wheel; a second shaft; a series of gears mounted on said second shaft and each arranged to operate an indicator of the third set; a ratchet-wheel connected with each of said gears; a lever loosely mounted on said second shaft adjacent to each of said gears; a pawl pivoted on each of said levers and arranged to engage one of said latter ratchet-wheels; an extension on each latter pawl; a third shaft; a sleeve arranged to slide on the third shaft but rotated thereby; a carriage arranged to move said sleeve axially when reciprocated; a series of arms on said sleeve each arranged to move one of said levers on the rotation of the sleeve and thereby cause these levers to rotate their ratchet-wheels and move the third set of indicators; a series of movable shields mounted on said carriage and arranged to engage the extensions of said pawls respectively and normally hold these pawls out of engagement; the pawls that operate the first set of indicators each having an arm thereon arranged to engage one of said shields and move it a certain distance to permit a lever-carried pawl to engage its ratchet-wheel, and when moved by said latter arm to move an indicator a number of spaces equal to the digit of the key depressed to operate a pawl of the first set of indicators; means for causing the operation of any of the second set of indicators to rotate said third shaft and cause said arm-carrying sleeve to rotate and thereby rock the pawl-carrying arms once for each movement of the latter indicator through one space; and means for causing the act of registering a number on certain of the indicators of the first and second sets to move the carriage into position of coöperation with other of the said gears.

33. In a calculator, the combination of a set of digit-indicators; a second set of digit-indicators; a third set of digit-indicators; a set of ratchet-wheels; means for causing any of the first and second sets of digit-indicators to be driven from one of said ratchet-wheels; a shaft having a series of pawls thereon; each pawl being in alinement with one of said ratchet-wheels; a set of digit-keys; means for causing the operation of each of the keys to move the pawl-carrying shaft a distance proportional to the digit of the operating-key; means for bringing any desired pawl into position of engagement with its ratchet-wheel; a series of gears mounted on said second shaft and each arranged to operate an indicator of the third set; a ratchet-wheel connected with each of said gears; a lever loosely mounted on said second shaft adjacent to each of said gears; a pawl pivoted on each of said levers and arranged to engage one of said latter ratchet-wheels; an extension on each latter pawl; a third shaft; a sleeve arranged to slide on the third shaft but rotated thereby; a carriage arranged to move said sleeve axially when reciprocated; a series of arms on said sleeve each arranged to move one of said levers on the rotation of the sleeve and thereby cause these levers to rotate their ratchet-wheels and move the third set of indicators; a series of movable shields mounted on said carriage and arranged to engage the extensions of said pawls respectively and normally hold these pawls out of engagement; means for retaining these shields in the positions to which they are moved by said arms on said pawls; means for releasing and returning the shields to their normal position; the pawls that operate the first set of indicators each having an arm thereon arranged to engage one of said shields and move it a certain distance to permit a lever-carried pawl to engage its ratchet-wheel, and when moved by said latter arm to move an indicator through a number of spaces equal to the digit of the key depressed to operate a pawl of the first set of indicators; and means for causing the operation of any of the second set of indicators to rotate said third shaft and cause said arm-carrying sleeve to rotate and thereby rock the pawl-carrying arm once for each movement of the latter indicator through one space.

34. In a calculator, the combination of a carriage; a series of curved guides mounted on the carriage in transverse alinement; a curved shield slidable on each guide and arranged to reciprocate; means for holding each shield at one limit of its movement; a pawl on each shield; and a pivoted rack-bar arranged to engage with each said pawl and retain the shield in the positions to which moved from said limit of movement.

35. In a calculator, the combination of a set of digit-indicators; means for causing the indicators to register; a second set of digit-indicators; means for causing the second set of indicators to register; a third set of indicators; means for moving the third set of indicators; a carriage having a series of members thereon arranged to coöperate with the indicator-moving means of the third set; means for causing the registering of one or more indicators of the first set to adjust an equal number of said members in positions relative to the digits registered; and means for causing the movement of registering on an indicator of the second set through each of its digit-spaces to cause said adjusted members to each engage an indicator-moving means of the third set and thereby cause its connected indicator to move through a number of digit-spaces equal to the digit registered on the first set when the said member was adjusted.

36. In a calculator, the combination of a set of digit-indicators; means for causing the indicators to register; a second set of digit-indicators; means for causing the second set of indicators to register; a third set of indicators; means for moving the third set of indicators; a carriage having a series of members thereon arranged to coöperate with the indicator-moving means of the third set; means for causing the registering of one or more indicators of the first set to adjust an equal number of said members in positions relative to the digits registered; and means for causing the movement of registering on an indicator of the second set through each of its digit-spaces to cause said adjusted members to each engage an indicator-moving means of the third set and thereby cause its connected indicator to move through a number of digit-spaces equal to the digit registered on the first set when the said member was adjusted; and means for resetting the indicators of the second set without affecting the said adjusted members.

37. In a calculator, the combination of a set of digit-indicators; means for causing the indicators to register; a second set of digit-indicators; means for causing the second set of indicators to register; a third set of indicators; means for moving the third set of indicators; a carriage having a series of members thereon arranged to coöperate with the indicator-moving means of the third set; means for causing the registering of one or more indicators of the first set to adjust an equal number of said members in positions relative to the digits registered; means for causing the movement of registering on an indicator of the second set through each of its digit-spaces to cause said adjusted members to each engage an indicator-moving means of the third set and thereby cause its connected indicator to move through a number of digit-spaces equal to the digit registered on the first set when the said member was adjusted; means for causing said latter operation after the registering of the indicators of the third set, to move the carriage and bring each said adjusted member into position for coöperation with an indicator-moving means next adjacent the one last operated; and thereby cause the subsequent movement of registering on an indicator of the second set, through each of its digit-spaces to cause said adjusted members to each engage a said latter indicator-moving means and thereby cause its connected indicator to move through a number of digit-spaces equal to the digit registered on the first set when the said member was adjusted.

In testimony whereof I have hereunto set my hand this 26th day of June, A. D. 1901.

EDWARD W. SIBLEY.

In presence of—
  BENJ. ARNOLD,
  C. S. MARSH.